(12) United States Patent
Leegate et al.

(10) Patent No.: US 12,096,813 B2
(45) Date of Patent: Sep. 24, 2024

(54) SYSTEM, METHOD, AND APPARATUS FOR DETECTING IR RADIATION IN A MARKER SYSTEM

(71) Applicant: ARCACHON HOLDINGS LLC, Clearwater, FL (US)

(72) Inventors: Gary Leegate, Clearwater, FL (US); Marcia Baldwin, Clearwater, FL (US); Ray Bischoff, Clarksville, TN (US)

(73) Assignee: ARCACHON HOLDINGS LLC, Clearwater, FL (US)

( * ) Notice: Subject to any disclaimer, the term of this patent is extended or adjusted under 35 U.S.C. 154(b) by 0 days.

(21) Appl. No.: 18/456,866

(22) Filed: Aug. 28, 2023

(65) Prior Publication Data
US 2023/0397686 A1    Dec. 14, 2023

Related U.S. Application Data

(63) Continuation of application No. 17/331,671, filed on May 27, 2021, now Pat. No. 11,771,164, which is a
(Continued)

(51) Int. Cl.
*A42B 3/04*   (2006.01)
*A42B 3/30*   (2006.01)
(Continued)

(52) U.S. Cl.
CPC ............ *A42B 3/0433* (2013.01); *A42B 3/046* (2013.01); *A42B 3/30* (2013.01); *F41A 17/08* (2013.01);
(Continued)

(58) Field of Classification Search
CPC ........... G01S 19/13; G08B 6/00; G08B 21/02; H04W 4/023; H05B 47/19; F41H 1/04
See application file for complete search history.

(56) References Cited

U.S. PATENT DOCUMENTS

| | | |
|---|---|---|
| 3,383,155 A | 5/1968 | Bourke |
| 4,195,328 A | 3/1980 | Harris, Jr. |
| (Continued) | | |

FOREIGN PATENT DOCUMENTS

WO    WO2009101391 A2    8/2009

*Primary Examiner* — Sonji N Johnson
*Assistant Examiner* — Asifa Habib
(74) *Attorney, Agent, or Firm* — Larson & Larson; Frank Liebenow; Justin P. Miller

(57) ABSTRACT

A marker system includes an enclosure with a controller therewithin. Emitters are electrically interfaced to the controller and include visible wavelength emitters and infrared wavelength emitters. The controller is configured to selectively initiate a flow of electric current though the visible wavelength emitters or through the infrared wavelength emitters causing the visible wavelength emitters or the infrared wavelength emitters to emit light and the light passes through the enclosure. There is at least one infrared detector, each of which is electrically interfaced to the controller and each of which is configured to detect infrared light that enters the enclosure. When the controller receives an electrical signal from any of the at least one infrared detector indicating reception of infrared light, the controller emits a signal to warn of the reception of infrared light (e.g., an audible signal, a vibration, a wireless signal, a wired signal).

23 Claims, 30 Drawing Sheets

Related U.S. Application Data continuation-in-part of application No. 16/790,069, filed on Feb. 13, 2020, now Pat. No. 11,047,984, which is a continuation-in-part of application No. 16/416,796, filed on May 20, 2019, now Pat. No. 10,897,805, which is a continuation of application No. 15/901,505, filed on Feb. 21, 2018, now Pat. No. 11,049,379, which is a continuation-in-part of application No. 15/091,596, filed on Apr. 6, 2016, now abandoned.

(60) Provisional application No. 62/163,104, filed on May 18, 2015.

(51) Int. Cl.

| | | |
|---|---|---|
| *F41A 17/08* | (2006.01) | |
| *G01S 7/481* | (2006.01) | |
| *G01S 17/74* | (2006.01) | |
| *G01S 19/13* | (2010.01) | |
| *G08B 6/00* | (2006.01) | |
| *G08B 21/02* | (2006.01) | |
| *G08B 23/00* | (2006.01) | |
| *G08B 27/00* | (2006.01) | |
| *H04W 4/02* | (2018.01) | |
| *H05B 47/19* | (2020.01) | |
| *F41H 1/04* | (2006.01) | |
| *H05B 45/20* | (2020.01) | |

(52) U.S. Cl.
CPC ............ *G01S 7/4813* (2013.01); *G01S 17/74* (2013.01); *G01S 19/13* (2013.01); *G08B 6/00* (2013.01); *G08B 21/02* (2013.01); *G08B 23/00* (2013.01); *G08B 27/006* (2013.01); *H04W 4/023* (2013.01); *H05B 47/19* (2020.01); *F41H 1/04* (2013.01); *H05B 45/20* (2020.01)

(56) References Cited

U.S. PATENT DOCUMENTS

| | | |
|---|---|---|
| 4,901,210 A | 2/1990 | Hanabusa |
| 5,274,379 A | 12/1993 | Carbonneau |
| 5,357,409 A | 10/1994 | Glatt |
| 5,414,405 A | 5/1995 | Hogg et al. |
| 5,633,623 A | 5/1997 | Campman |
| 5,743,621 A | 4/1998 | Mantha |
| 5,748,891 A | 5/1998 | Fleming |
| 5,966,226 A | 10/1999 | Geber |
| 6,201,495 B1 | 3/2001 | Lemelson et al. |
| 6,213,623 B1 | 4/2001 | Campman |
| 6,283,620 B1 | 9/2001 | Taylor |
| 6,325,521 B1 | 12/2001 | Gregg |
| 6,752,510 B1 | 6/2004 | Appiah |
| 7,021,790 B2 | 4/2006 | Parsons |
| 7,023,004 B2 | 4/2006 | Ford et al. |
| 7,046,186 B2 | 5/2006 | Rosenberg |
| 7,221,263 B2 | 5/2007 | Moore |
| 7,315,036 B2 | 1/2008 | Ford et al. |
| 7,505,279 B2 | 3/2009 | Ohtaki et al. |
| 7,722,205 B2 | 5/2010 | Kim |
| 7,764,185 B1 | 7/2010 | Manz |
| 7,831,150 B2 | 11/2010 | Roes et al. |
| 8,025,432 B2 | 9/2011 | Wainright |
| 8,444,291 B2 | 5/2013 | Swan et al. |
| 8,477,492 B2 | 7/2013 | Rothkopf et al. |
| 8,485,686 B2 | 7/2013 | Swan et al. |
| 8,534,861 B2 | 9/2013 | Leegate et al. |
| 8,573,797 B2 | 11/2013 | Spartano et al. |
| 8,672,504 B2 | 3/2014 | Kramer |
| 8,908,389 B2 | 12/2014 | Teetzel |
| 9,144,261 B2 | 9/2015 | Leegate et al. |
| 9,175,837 B1 | 11/2015 | Leegate et al. |
| 9,175,838 B1 | 11/2015 | Leegate et al. |
| 9,247,779 B1* | 2/2016 | Aloumanis .......... A42B 3/0426 |
| 9,341,714 B2 | 5/2016 | Leegate et al. |
| 9,435,597 B2 | 9/2016 | Goren |
| 9,476,982 B2 | 10/2016 | Leegate et al. |
| 9,746,561 B2 | 8/2017 | Leegate et al. |
| 10,484,652 B2* | 11/2019 | Hobby .................... H04B 1/385 |
| 10,718,847 B2* | 7/2020 | Gagliano .............. F21V 23/008 |
| 10,801,813 B2* | 10/2020 | Moseman ............... G06F 1/266 |
| 2007/0236384 A1 | 10/2007 | Ivtsenkov |
| 2008/0170838 A1* | 7/2008 | Teetzel .................... A42B 3/042 |
| | | 348/E5.025 |
| 2008/0134562 A1 | 8/2008 | Teetzel |
| 2008/0216699 A1 | 9/2008 | McAleer et al. |
| 2009/0144872 A1 | 6/2009 | Lebel |
| 2009/0209227 A1* | 8/2009 | Greer ................... G08B 25/016 |
| | | 455/404.2 |
| 2010/0128468 A1 | 5/2010 | Ong et al. |
| 2011/0170280 A1 | 7/2011 | Soto |
| 2011/0205731 A1 | 8/2011 | O'Keefe |
| 2011/0239354 A1 | 10/2011 | Celona |
| 2013/0114275 A1 | 5/2013 | Cristofaro |
| 2013/0204930 A1* | 8/2013 | Hobby .................... H04L 65/61 |
| | | 709/203 |
| 2013/0215281 A1* | 8/2013 | Hobby .................... H04B 1/385 |
| | | 348/207.1 |
| 2014/0000013 A1* | 1/2014 | Redpath ................ H05K 1/028 |
| | | 29/592.1 |
| 2014/0009920 A1* | 1/2014 | Swan .................... F21V 21/0885 |
| | | 362/184 |
| 2014/0020159 A1* | 1/2014 | Teetzel .................... A42B 3/04 |
| | | 2/422 |
| 2014/0115759 A1* | 5/2014 | Tomlin ................. A63B 69/002 |
| | | 340/689 |
| 2016/0088891 A1 | 3/2016 | Walsh |
| 2016/0290764 A1* | 10/2016 | Chen .................. G02B 27/0172 |
| 2016/0309826 A1 | 10/2016 | Anderson |
| 2018/0109740 A1* | 4/2018 | Pickett ..................... A61B 5/01 |

\* cited by examiner

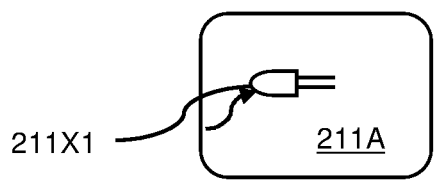
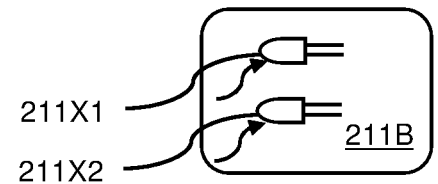
FIG. 25
FIG. 26
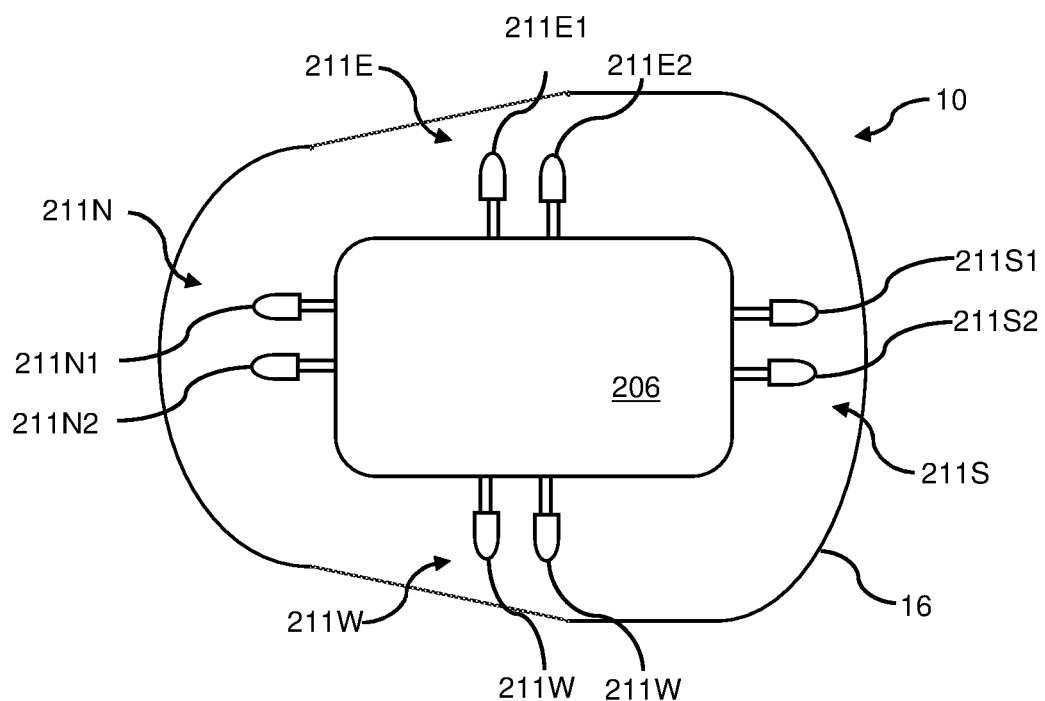
FIG. 27

SYSTEM, METHOD, AND APPARATUS FOR DETECTING IR RADIATION IN A MARKER SYSTEM

CROSS-REFERENCE TO RELATED APPLICATIONS

This application is related to U.S. Pat. No. 9,144,261 (issued Sep. 29, 2015), 9,175,837 (issued Nov. 3, 2015), U.S. Pat. No. 8,534,861 (issued Sep. 17, 2013), and U.S. Pat. No. 9,175,838 (issued Nov. 3, 2015), and U.S. Pat. No. 9,341,714 (issued May 17, 2016), U.S. Pat. No. 9,476,982 (issued Oct. 25, 2016) and U.S. Pat. No. 9,746,561 (issued Aug. 29, 2017). This application is a continuation-in-part of U.S. patent application Ser. No. 17/331,671 filed May 27, 2021; which is a continuation-in-part of U.S. patent application Ser. No. 16/790,069 filed Feb. 13, 2020 now U.S. Pat. No. 11,047,984; which is a continuation-in-part of U.S. patent application Ser. No. 16/416,796 filed May 29, 2019 now U.S. Pat. No. 10,897,805; which is a continuation-in-part of U.S. patent application Ser. No. 15/901,505 filed Feb. 2, 2018 which is a continuation-in-part of U.S. patent application 15/091,596 filed Apr. 6, 2016, which takes priority from 62/163,104 filed May 18, 2015. The disclosures of each of the above are hereby incorporated by reference.

BACKGROUND OF THE INVENTION

Many helmets are equipped with marking systems (markers) that provide steady or flashing emissions in order to provide visibility of the wearer to co-combatants for identification and battlefield command and control. Often flashing signals are random, and in the case of multiple co-combatants such flashing signals can be incoherent, confusing, distracting, and sometimes confused with muzzle flash from gunfire.

Helmet-mounted marking systems can also be augmented to provide the wearer with alerts relating to identification-friend-or-foe (IFF) interrogations by infrared lasers and simultaneous visual signals to the interrogating co-combatant that the helmet wearer is a "Friendly". Upon an IFF interrogation, (1) the IFF-enabled helmet-mounted marker sends a haptic alert to the wearer via a cable and vibrator pad connected to the helmet-mounted marker and routed inside the helmet, and (2) the helmet-mounted marker emits a user-specified coded signal visible to the interrogating co-combatant identifying the helmet-wearer as a "Friendly," to help prevent fratricide. In cases where an IFF interrogation may be simultaneously received by more than one co-combatant, the visual coded flash back to the interrogator identifying the interrogated co-combatants as "Friendly" can be synchronized to provide further visual confirmation that the interrogated combatants are "Friendly".

Some military helmets are provided with mechanical attachment fitting means or "rails" often on the left and right sides of the helmet, such rails intended to provide secure attachment for other helmet-mounted equipment such as flashlights, helmet-mounted marker systems, and radio communication gear. In some cases, these rails include a means to transmit power to rail-connected devices from a helmet-mounted battery pack or a battery pack mounted on or otherwise carried by the helmet wearer. In some cases, these helmet-mounted mechanical attachment means also include connections which allow the transmission of data to equipment interconnected with the power/data rail.

Some equipment worn by a combatant either on the helmet or otherwise mounted or carried by the combatant such as helmet-mounted battery packs and wrist or chest-mounted tactical computers include satellite global positioning system (GPS) receivers used to establish and process such data relating to the combatant as location, direction, movement speed and time anywhere in the world.

Without synchronization of flashing signals or synchronized IFF interrogation responses of helmet-mounted personnel markers, such flashing signals are non-coherent, confusing, distracting, and are not easily distinguished from other flashing signals on the battlefield such as non-team members, enemy combatants, or muzzle flash from gunfire.

In some deployments, multiple marker devices are mounted to a single helmet, usually one on each side of the helmet. In such, as with individual marker devices, it is equally important to synchronize both flashing and operation of all marker devices that are mounted to one helmet, along with synchronizing between those mounted to one helmet and other helmet-mounted marker devices.

Further, there is a need for a marker system to detect incoming infrared including as examples from a coded IFF signal, a laser target designator, or a range finder and in some cases, the relative direction of the source of the incoming infrared What is needed is a system and method to detect and discern the characteristics of the incoming infrared radiation as received by a marker system, and the relative compass direction of the source.

SUMMARY OF THE INVENTION

In one embodiment, a marker system is disclosed having an enclosure with a controller located within the enclosure. Emitters are electrically interfaced to the controller and include visible wavelength emitters and infrared wavelength emitters. The controller is configured to selectively initiate a flow of electric current though the visible wavelength emitters or through the infrared wavelength emitters causing the visible wavelength emitters or the infrared wavelength emitters to emit light and the light passes through the enclosure. There are at least one infrared detector, each of which is electrically interfaced to the controller and each of which is configured to detect infrared light that enters the enclosure. When the controller receives an electrical signal from any of the at least one infrared detector indicating reception of infrared light, the controller emits a signal to warn of the reception of infrared light (e.g., an audible signal, a vibration, a wireless signal, a wired signal).

In another embodiment, a method of detecting infrared light at a marker device is disclosed. The method includes an enclosure with a controller located therein, and emitters electrically interfaced to the controller. The emitters include visible wavelength emitters and infrared wavelength emitters and the controller is configured to selectively initiate a flow of electric current though the visible wavelength emitters or through the infrared wavelength emitters causing the visible wavelength emitters or the infrared wavelength emitters to emit light. The light passes through the enclosure. When infrared light is received by at least one infrared detector that is electrically interfaced to the controller and each of the at least one infrared detector is configured to detect infrared light that enters the enclosure, an electrical signal is received by the controller indicating reception of infrared light and the controller emits a signal to warn of the reception of infrared light (e.g., an audible signal, a vibration, a wireless signal, a wired signal).

In another embodiment, a marker system is disclosed including an enclosure with a controller located within the enclosure. There are also emitters electrically interfaced to the controller. The emitters include visible wavelength emitters and/or infrared wavelength emitters, and the controller is configured to selectively initiate a flow of electric current though the visible wavelength emitters and/or through the infrared wavelength emitters causing the visible wavelength emitters or the infrared wavelength emitters to emit light and the light passing through the enclosure. At least two infrared detectors are electrically interfaced to the controller. A first infrared detector of the at least two infrared detectors is aimed to receive light through the enclosure. A second infrared detector of the at least two infrared detectors is aimed to receive light from a different direction through the enclosure. When the controller receives an electrical signal that indicates reception of infrared light from any of the infrared detectors, the controller emits a signal to alert of the reception of infrared light (e.g., a sound, vibration, communication signal) and, in some embodiments, the alert includes an indication of the general direction from which the infrared light was received based upon the amount of infrared light received by each of the at least two infrared detectors.

BRIEF DESCRIPTION OF DRAWINGS

The invention can be best understood by those having ordinary skill in the art by reference to the following detailed description when considered in conjunction with the accompanying drawings in which:

FIG. 25 illustrates a schematic diagram of a first infrared detector.

FIG. 26 illustrates a schematic diagram of a second infrared detector.

FIG. 27 illustrates a plan view of a marker with infrared detection in one or more directions.

DETAILED DESCRIPTION OF THE INVENTION

Figure 1:
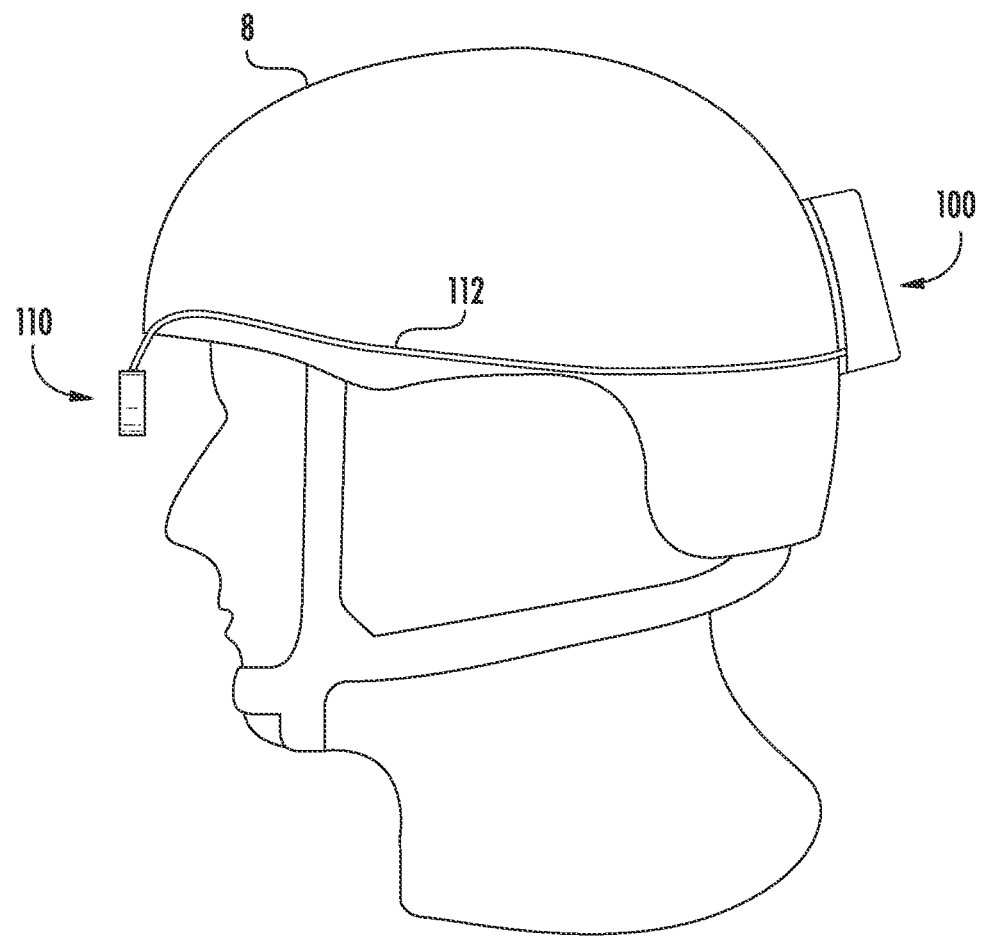
FIG. 1 illustrates a view of a helmet of the prior art with an attached power source.

Reference will now be made in detail to the presently preferred embodiments of the invention, examples of which are illustrated in the accompanying drawings. Throughout the following detailed description, the same reference numerals refer to the same elements in all figures.

Referring to FIG. 1, a view of a helmet 8 of the prior art with a power source 100 for providing power is shown, for example, for providing power to a heads-up display. Many helmets 8 are known to have some sort of indicator 110 such as a heads-up-display or a set of one or more LEDs to convey information to the wearer of the helmet 8. In some embodiments, the indicator 110 is a heads-up display showing images, video, and/or text of various activities such as other troops, enemy operations, aircraft locations, enemy equipment operations, maps, etc. In some embodiments, the indicator 110 is a set of LEDs used to indicate certain activities such as combatants being nearby or when to advance and when to retreat.

No matter what the indicator 110 is or what it is used for, or for that matter, whatever device is connected to or integrated into the helmet 8, the indicator 110 or other devices require power to operate. As shown in FIG. 1, the power (an optionally control and data signals) comes from a power source 100 that is typically mounted to the helmet 8, often being mounted on a back surface of the helmet 8. Connection between the indicator 110 and the power source 100 is by an indicator cable 112.

In some embodiments, the power source 100 includes a primary battery that is replaced, typically before each mission. In some embodiments, the power source 100 includes a rechargeable battery that is recharged, typically, before each mission. Any source of power is known and included herein.

Figure 2:
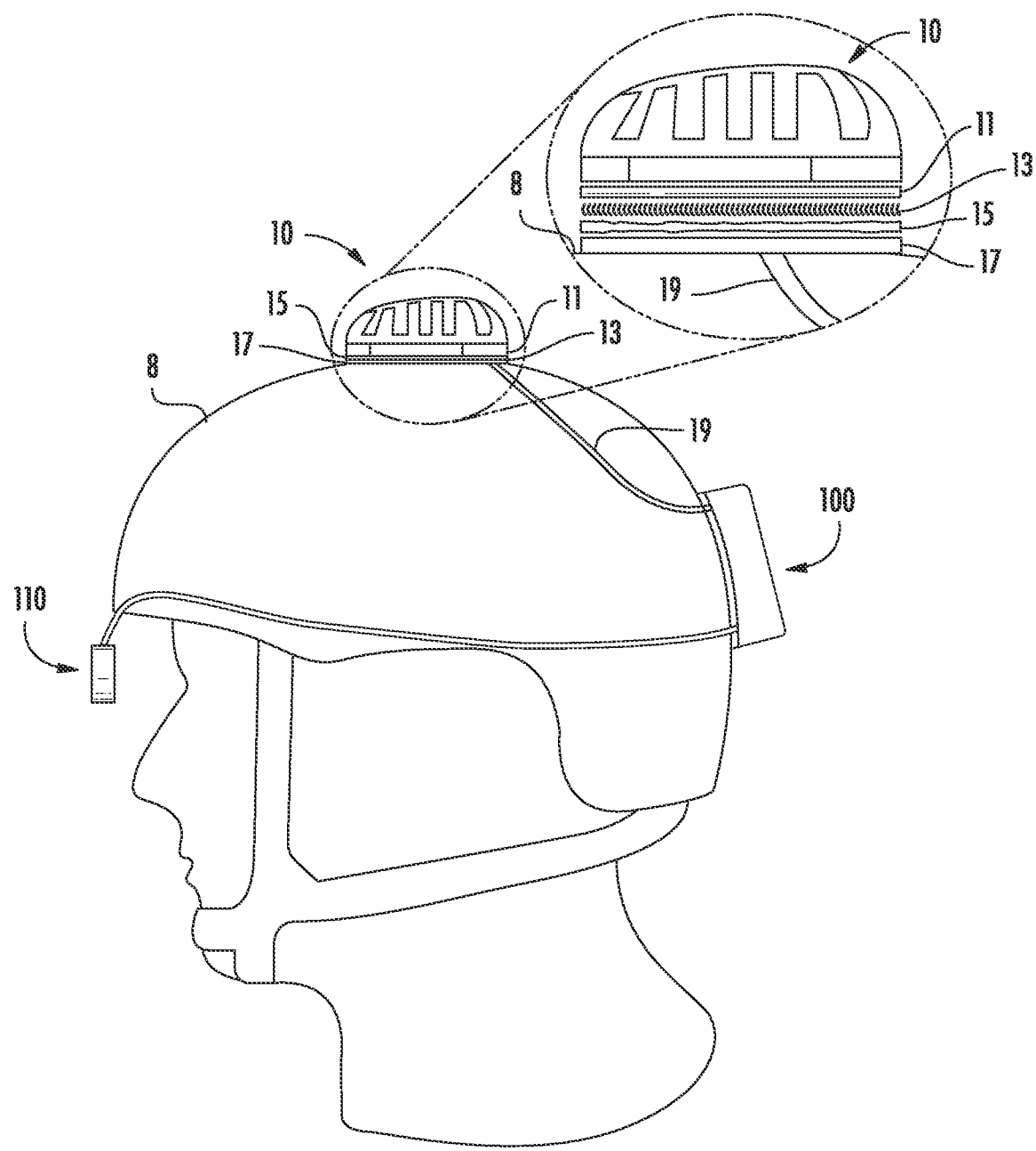
FIG. 2 illustrates a view of the helmet with a marker system deriving power from the attached power source through a power/data inductive transfer system.

Referring to FIG. 2, a view of the helmet 8 (as in FIG. 1) with a marker system 10 deriving power from the power source 100 is shown. To reduce the probability of the wearer 1 having one good battery and one weak battery, it is best to eliminate all batteries except for one battery, therefore requiring that only one battery be maintained. In prior systems, each device (e.g., the marker system 10 and the indicator 110 system) had separate and independent power sources (e.g., separate batteries) and the wearer was in the position of making sure both (or all) batteries were fully charged before a mission.

In FIG. 2, the need to charge/recharge the marker system 10 through a direct wired connection to a power source is eliminated or reduced by providing electrical power through a wireless interface to the marker system. A wireless interface is used as a power (and optionally data) interface in lieu of an electrical contact interface which is prone to failure due to contact erosion or deposits caused by the environment in which the helmet 8 and electrical components are used. In FIG. 2, the power/data receiving coil 11 and the power/data transmitting coil 17 are visible from the side. The marker system 10 has a power/data receiving coil 11 and the helmet 8 has a power/data transmitting coil 17. The power/data transmitting coil 17 is connected to the power source 100 (and control circuit) through a power cable 19. Since the marker system 10 is typically removably attached to the helmet 8, hook and loop material 13/15 are shown between the power/data receiving coil 11 and the power/data transmitting coil 17. When the marker system 10 is attached to the helmet 8 (e.g., by way of the hook and loop material 13/15), the power/data transmitting coil 17 is energized by an alternating or pulsed frequency that creates a magnetic field around both the power/data transmitting coil 17 and the power/data receiving coil 11, causing current to flow in the power/data receiving coil 11 that is conditioned and optionally stored within the marker system 10. As the marker system 10 often emits pulses of light energy, instantaneous power requirements vary with the amount of light energy needed and, therefore, in most embodiments, the energy received from the power/data receiving coil 11 is often stored in a power storage device 202 (see FIGS. 10, 10A, 10B, 10C) such as a rechargeable battery or a capacitor that is internal to the marker system 10.

In some embodiments, the power/data transmitting coil 17 and the power/data receiving coil 11 are air-wound while in other embodiments, either or both of the power/data transmitting coil 17 and the power/data receiving coil 11 have magnetic cores (e.g., magnetic cores made of iron or powdered iron) as the magnetic core has the ability to improve power transfer efficiencies. Also, in some embodiments, the driver circuit is tuned and/or adjusted to provide an optimum alternating current or pulsed current frequency given an impedance of the power/data transmitting coil 17. In such, the power/data receiving coil 11 and the power/communications driver 104 are preferably tuned to optimize reception of power at that frequency and, thereby, providing optimal power transfer between the power source 100 and the marker system 10.

Figure 3:
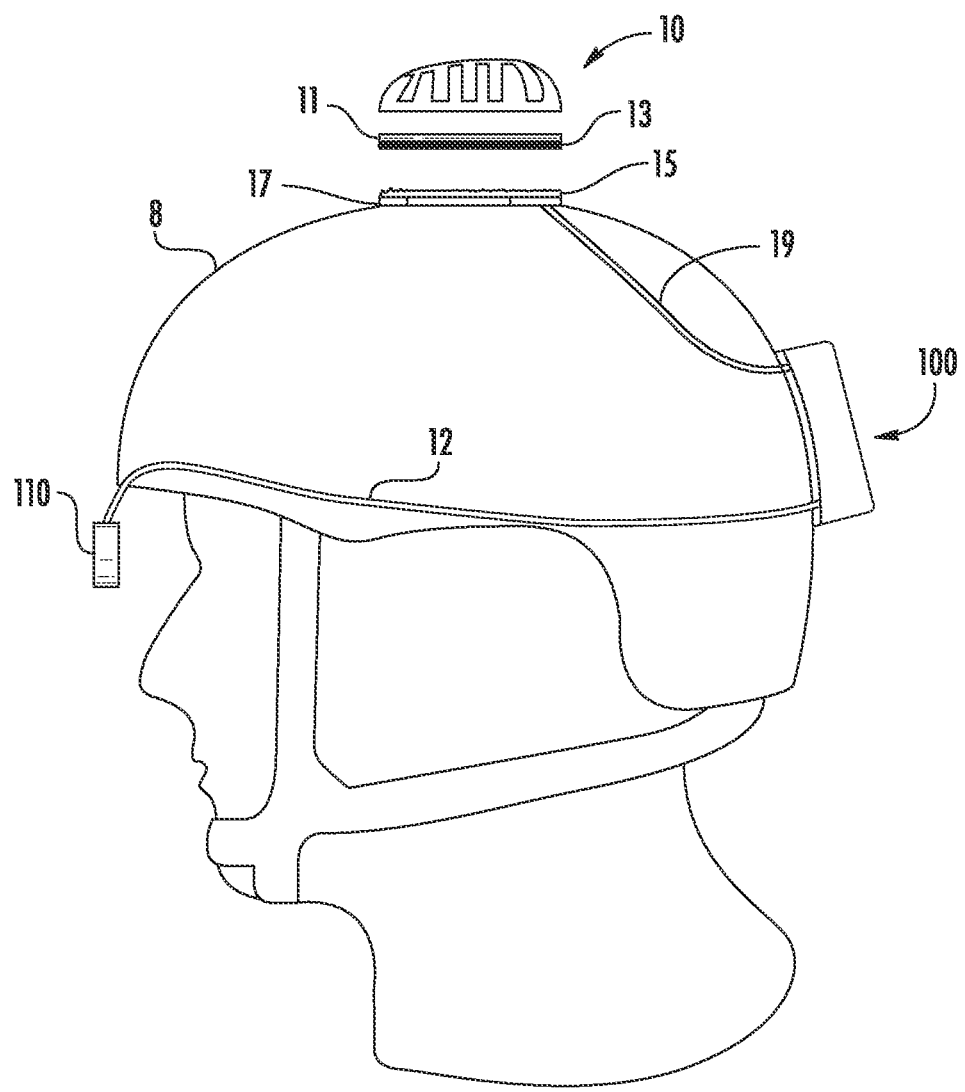
FIG. 3 illustrates a view of the helmet with the marker system lifted from the helmet showing elements of the power/data inductive transfer system.

Referring to FIG. 3, a view of the helmet with the marker system 10 lifted from the helmet 8 is shown. In many embodiments, the marker system 10 is removable from the helmet 8 for maintenance, reprogramming, etc. In such, the marker system 10 is removably attached to the helmet 8 by any way known, one of which is by providing one type of hook and loop material 13 attached to the marker system 10 and the mating type of hook and loop material 15 to the helmet 8. In such, the power/data transmitting coil 17 and the power/data receiving coil 11 are spaced apart from each other by the one type of hook and loop material 13 and the mating type of hook and loop material 15, though closer spacing is possible by having the one type of hook and loop material 13 around a periphery of the marker system 10 and the mating type of hook and loop material 15 arranged in a similar fashion on the surface of the helmet 8 and having one or both of the power/data transmitting coil 17 and the power/data receiving coil 11 set-off from respective surfaces of the marker system 10 and the surface of the helmet 8.

Figure 4:
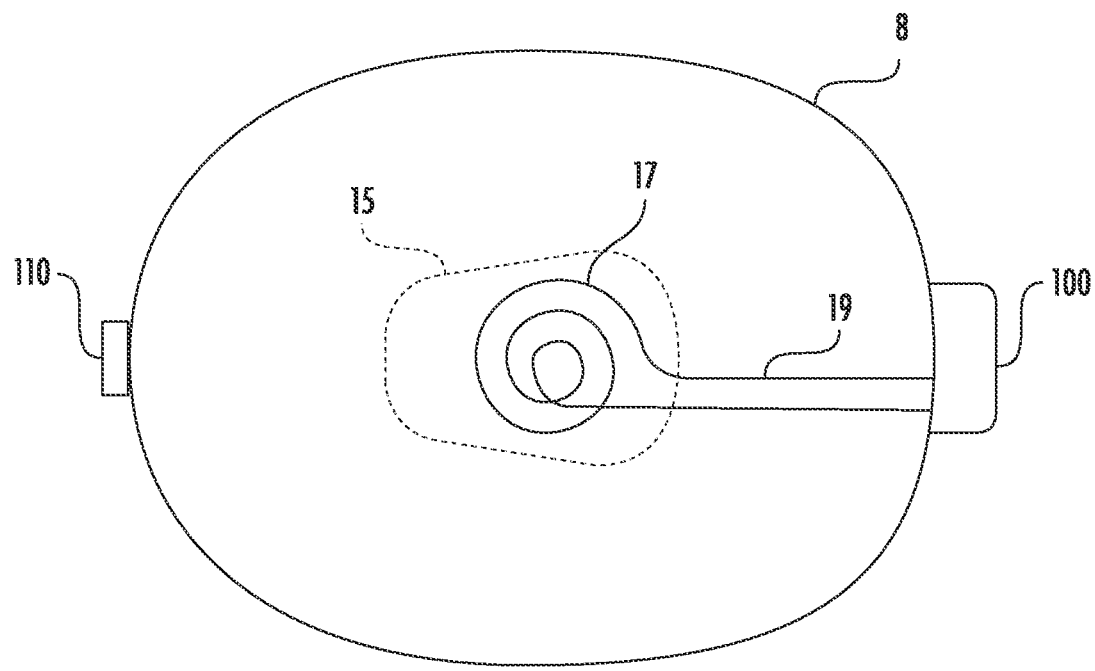
FIG. 4 illustrates a view of the helmet side of the power/data transfer system showing the power/data transmitting coil.

Referring to FIG. 4, a top view of the helmet side of the power transfer system is shown. In this, the power/data transmitting coil 17 is shown connected to the power source 100 (and power/communications driver 104—see FIG. 9) by a power cable 19. The one-type of hook and loop material 15 is shown as an example.

Figure 5:
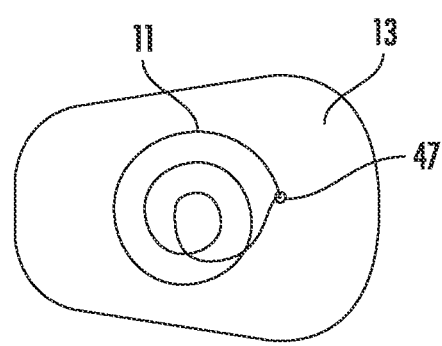
FIG. 5 illustrates a view of the marker system side of the power/data transfer system.

Referring to FIG. 5, a bottom view of the marker system 10 is shown. The marker system 10 has a power/data receiving coil 11 located to align with the power/data transmitting coil 17 of the helmet 8 when the marker system 10 is held to the helmet 8 by, for example, the one-type of hook and loop material 15 of the helmet 8 and the mating type of hook and loop material 13 of the marker system 10. In embodiments in which the power/data receiving coil 11 is located external to the enclosure of the marker system 10, a through-hole 47 provides a path for the wires of the power/data receiving coil 11 to enter into the marker system 10. It is anticipated that the through-hole 47 is sealed after the wires are installed to maintain a water-tight enclosure for the marker system 10.

Figure 6:
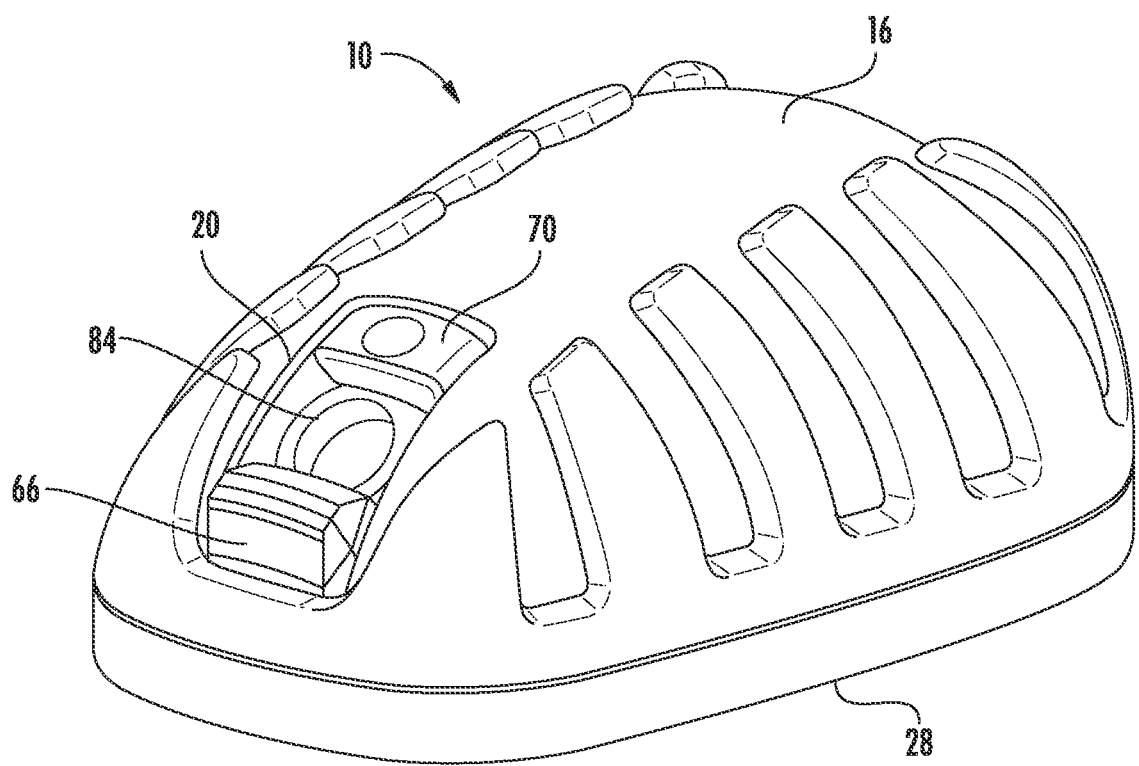
FIG. 6 illustrates a perspective view of the marker system.
Figure 7:
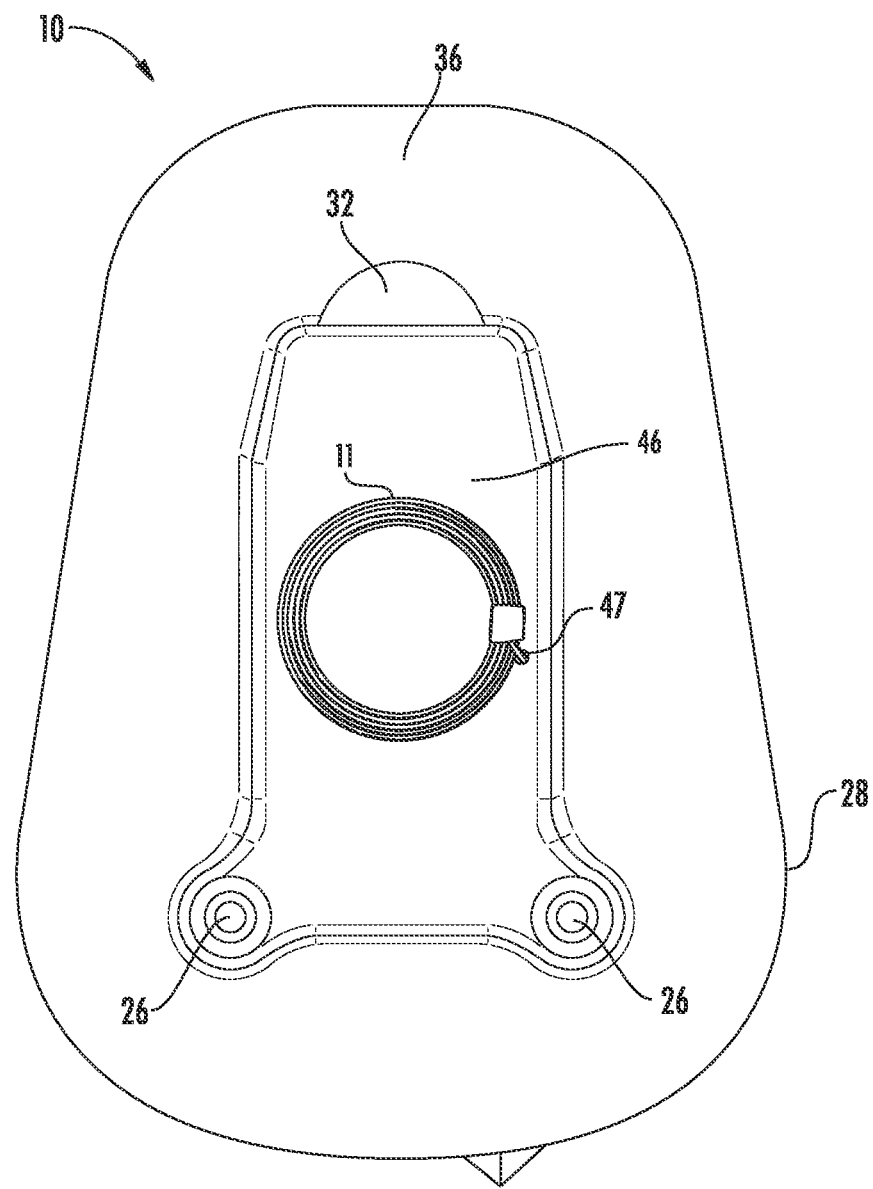
FIG. 7 illustrates a bottom view of the marker system.

Referring to FIGS. 6 and 7, a perspective view and a bottom view of the marker system 10 is shown. For completeness, a marker system 10 is shown as an example having a bottom enclosure 28 that is connected to a top enclosure 16 (e.g., by screws, an ultrasonic weld, or adhesive), sealing the marker system 10. The top enclosure 16 and, optionally the bottom enclosure 28 are translucent or transparent, thereby allowing light radiation in/out as needed for signaling and/or visibility purposes. Various controls 20/84/66 are employed for the wearer to control the marker system 10, preferably without any need to look at the marker system 10 as the marker system is typically mounted on the helmet 8 that is worn by the wearer and operated by hand-manipulation of the various controls in the blind, out of sight of the wearer.

In FIG. 7, the bottom surface of the bottom enclosure 28 is shown. In some embodiments, the marker system 10 includes power storage device 202. Although, in some embodiments, it is anticipated that the power storage device 202 (see FIG. 10) that is removable through a door 32 while in other embodiments, the bottom enclosure 28 is sealed, having the power/data receiving coil 11 located as close to the bottom surface of the bottom enclosure 28 as possible to maximize power transfer efficiency between the power/data transmitting coil 17 and the power/data receiving coil 11.

Figure 8:
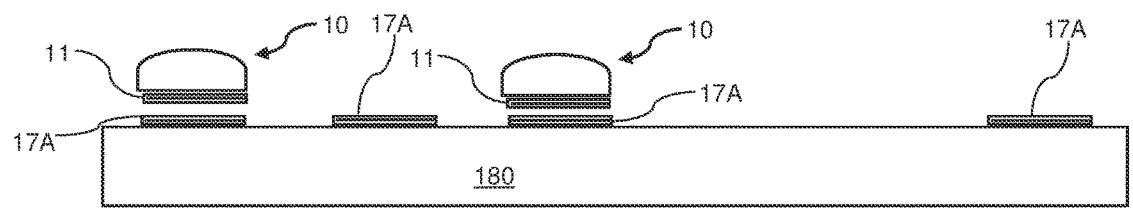
FIG. 8 illustrates a multiple marker system charger of the power transfer system.

Referring to FIG. 8, a marker system charger 180 of the power transfer system is shown. As, in some embodiments, each marker system 10 has a power storage device 202 (see FIG. 10), it is anticipated that, is some embodiments, there are marker system chargers 180 (e.g., external to the helmet 8) for charging one or more marker system(s) 10 that are removed from the helmet 8. This example, a marker system charger 180 has multiple charging locations, each having a charging station power/data transmitting coil 17A for transmitting power (and optionally data) to the power/data receiving coil 11 of each marker system 10. Note that although multiple charging locations are shown, in some embodiments, the marker system charger 180 has a single charging location.

Figure 9:
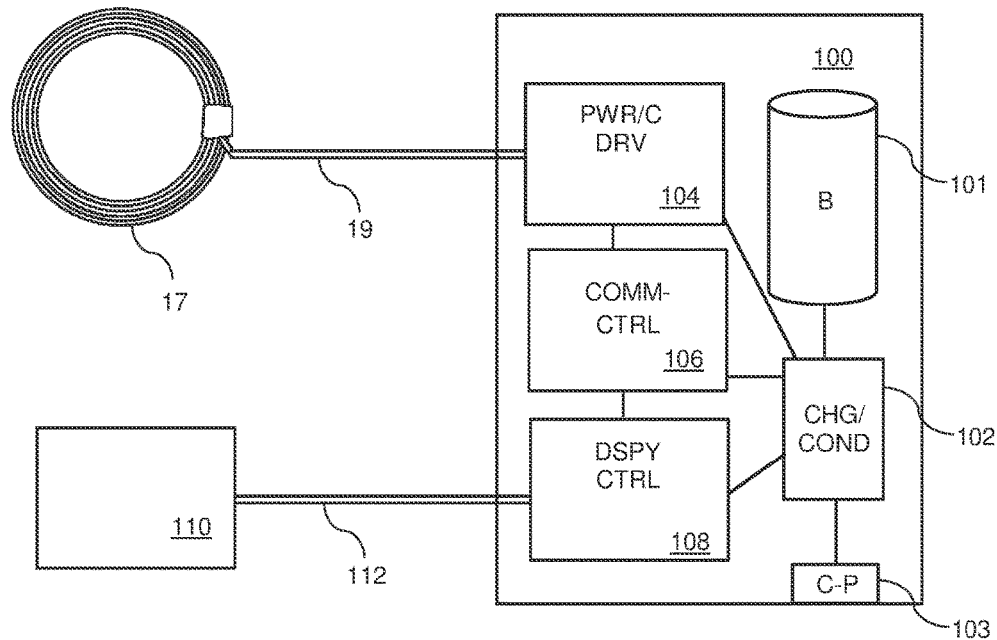
FIG. 9 illustrates a schematic view of the helmet side of the power/data transfer system.

Referring to FIG. 9, a schematic view of the helmet side of the power transfer system is shown (or the marker system charger 180). Note that the locations and details of the various subcomponents are shown as an example and other configurations are equally anticipated.

In the example of FIG. 9, the power source 100 has a power storage device 101 such as a battery (e.g., removable), a rechargeable battery (removable or fixed), a super capacitor, etc. In embodiments in which the power storage device 101 is rechargeable, a charge and power conditioning circuit 102 controls the charging as power to the charge and power conditioning circuit 102 is received from a charge port 103 (e.g., a connector such as a micro-USB connector).

Power from the power storage device 101 is regulated, converted, and conditioned as needed by the charge and power conditioning circuit 102 and delivered to the other electronic circuits, for example, to the power/communications driver 104, communications and, in this example, control module 106 and the display controller 108.

The display controller 108 receives information from the communications and control module 106 (e.g., information to display) and controls the indicator 110 (e.g., LEDs or graphics display) through the indicator cable 112 to display the information that is received.

The power/communications driver 104 receives power and/or data from the charge and power conditioning circuit 102 and drives the power/data transmitting coil 17 with the appropriate voltage and frequency, connected through a power cable 19. This creates an electromagnetic field around the power/data transmitting coil 17. In some embodiments, the power/communications driver 104 also receives information from the communications and control module 106 and modulates that information across the power/data transmitting coil 17 for communicating with the power/data receiving coil 11 which is positioned within the electromagnetic field, and hence, data is transferred to/from the marker system 10.

Figure 10:
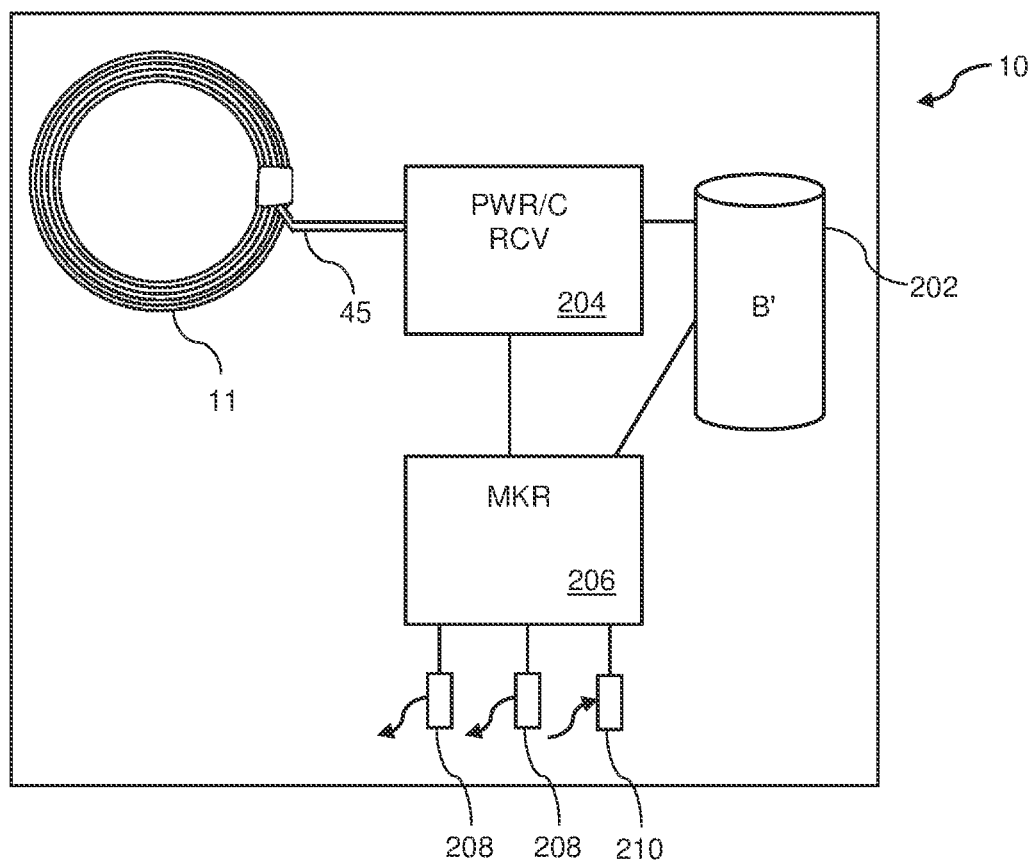
FIGS. 10, 10A, 10B, and 10C illustrate schematic views of the helmet side of the power/data transfer system of the synchronized flashing system.
Figure 10A:
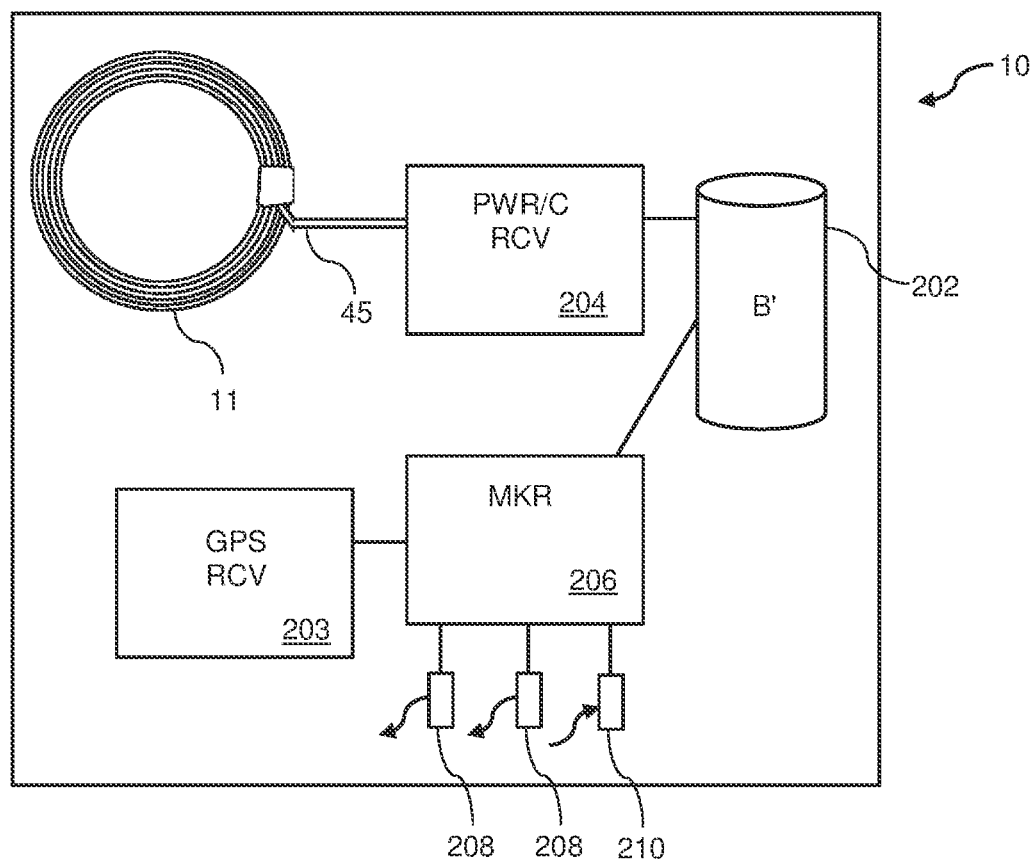
Figure 10B:
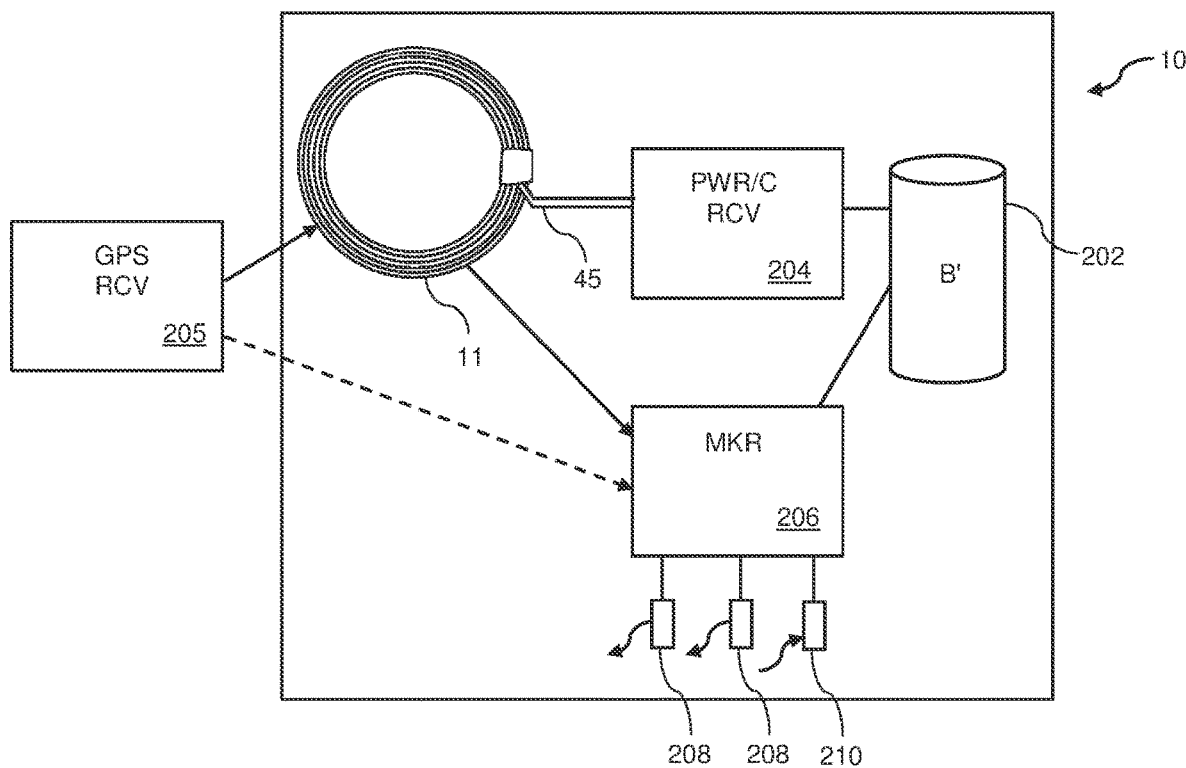
Figure 10C:
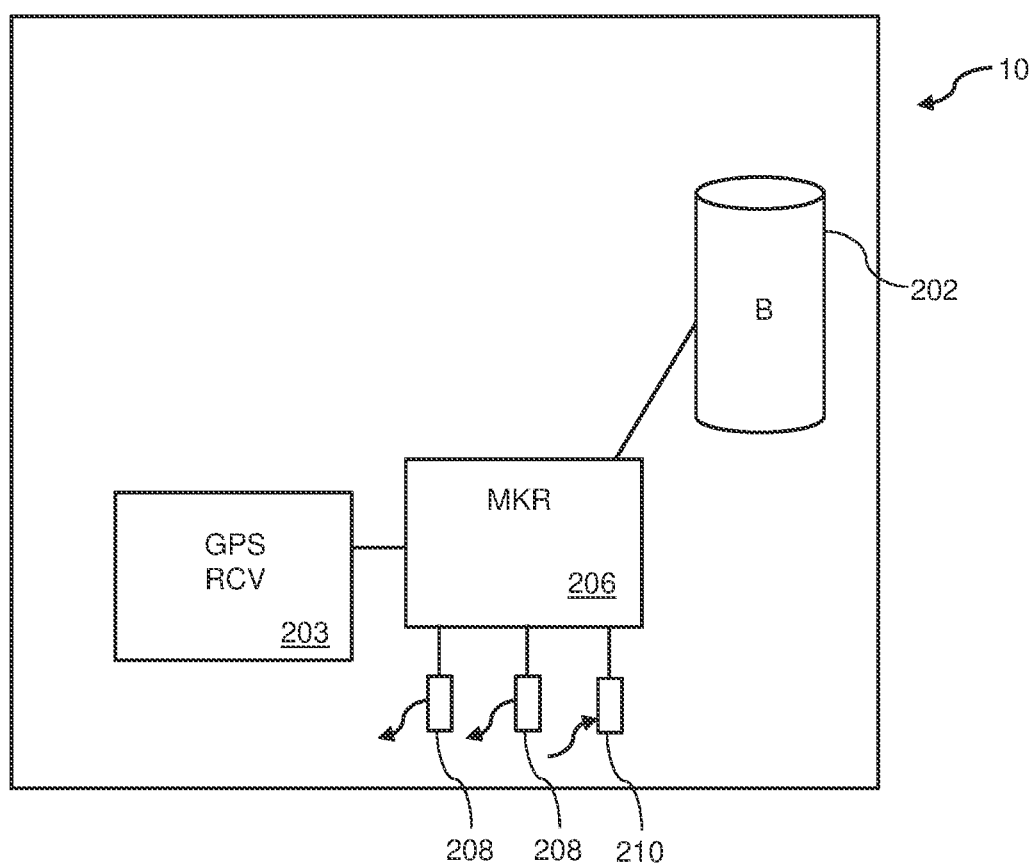

Referring to FIGS. 10, 10A, 10B, and 10C, schematic views of the helmet side of the flash synchronization system are shown. In FIG. 10, only the power reception system of the marker system 10 is shown, while in FIG. 10A, an internal GPS receiver 203 is included in the marker system 10. In FIG. 10B, an external GPS receiver 205 is provided in another electronic device (not shown for clarity) and data from the external GPS (e.g., the time value from the global positioning satellite) is transferred into the marker system 10 either by wire, wirelessly, or through the power/data transmitting coil 17 communicating with the power/data receiving coil 11. In FIG. 10C, the marker system 10 is self-contained, having its own source of power, power storage device 202, and an internal GPS receiver 203 for receiving the time value from the global positioning satellite for synchronization.

Although the power/data receiving coil 11 has been shown mounted on an outside surface of the bottom enclosure 28 of the marker system 10, it is equally anticipated that the power/data receiving coil 11 be located within the bottom enclosure 28 (e.g., molded in) or within the enclosure 16/28 of the marker system 10 (or any other location), in some embodiments connected by a wire 45.

In the example shown, a marker system 10 is shown in a simple form, having a marker controller 206 that selectively illuminates one or more LEDs 208 and, optionally, receives indications from one or more light detecting elements 210 (e.g., interrogation requests). Operation and details of various marker systems 10 are detailed in the list of related patents included by reference (above).

Power to operate the marker controller 206 and LEDs 208 is derived either directly from the power/data receiver circuit 204 or from a power storage device 202 such as a rechargeable battery (removable or fixed), a super capacitor, etc. As battery management is often difficult, especially in field operations, the power/data receiver circuit 204 receives power from the power/data receiving coil 11 as the power/data transmitting coil 17 generates an electro-magnetic field responsive to the power/communications driver 104. This power is used to power the marker controller 206 and one or more LEDs 208 and/or to recharge the power storage device 202.

In embodiments in which the power/communications driver 104 also includes a data modulator that modulates information onto the power/data transmitting coil 17, that information is received by the power/data receiver circuit 204, demodulated by a data demodulator of the power/data receiver circuit 204, and transferred to the marker controller 206, for example, to adjust operation of the LEDs 208. In some embodiments, flashing of the one or more LEDs 208 is synchronized using a signal from one or more Global Positioning Satellites 240 (see FIGS. 11-15) by a GPS receiver 203/205. In embodiments in which the external GPS receiver 205 is external to the marker system 10, data from the GPS receiver is provided to the power/communications driver 104 that includes a data modulator. The data modulator modulates the data (e.g., time value) from the GPS receiver onto the power/data transmitting coil 17, which is then received by the power/data receiver circuit 204, demodulated by a data demodulator of the power/data receiver circuit 204, and transferred to the marker controller 206 where the data (e.g., time value) from the GPS receiver is used to synchronize flashing across multiple markers.

For example, if the flashing function selected by the user at 60 flashes per minute, the flash sequence will start at exactly the top of the next second and flash on for a fixed amount of time (e.g., ½ second) at the top of every subsequent second (e.g., 21:03:58:000, 21:03:59:000, 21:04:00:000, 21:04:01:000 . . . ). Neighboring helmet-mounted markers will also flash at these same times to synchronize with each other. In another example, the flashing function selected by the helmet-wearers is 30 flashes per minute, the flashes of all helmet-mounted markers start at the top of every other second of each minute (e.g., 21:03:58:00, 21:04:00:000, 21:04:02:000, 21:04:04:000 . . . ), each flash lasting for a pre-programmed interval such as ½ second or 1 second.

Each Global Positioning Satellites 240 transmits signals that include various information. One part of the information transmitted by the Global Positioning Satellites 240 is known as "Ephemeris data" which contains important information such as status of the satellite (healthy or unhealthy), current date, and time (e.g., a time value). As multiple marker systems 10 receive this Ephemeris data, in particular, the time value, each of these multiple marker systems 10 synchronize flashing to the time portion of the Ephemeris data.

In FIG. 10A, the internal GPS receiver 203 is internal to the marker system 10, directly receiving the radio frequency signal transmitted by one or more Global Positioning Satellites 240, extracting the time value and the marker controller 206 synchronizes flashing using the time value.

In FIG. 10B, the external GPS receiver 205 is external to the marker system 10 and the external GPS receiver 205 communicates data (e.g., the time value) to the marker controller 206 either by a wired data connection, wirelessly (e.g., short-range wireless transmission by radio frequencies or light frequencies), or through the power/data transmitting coil 17 communicating with the power/data receiving coil 11. The external GPS receiver 205 receives the signal transmitted by one or more Global Positioning Satellites 240 and relays the signal to the marker controller 206 of the marker system 10, for example through the power/data transmitting coil 17 to the power/data receiving coil 11. The time value is used by the marker controller 206 to synchronize flashing of one or more of the LEDs 208.

In FIG. 10C, the marker system 10 is self-contained, having its own source of power, power storage device 202, and an internal GPS receiver 203 for receiving the signal (e.g., including the time value) from the global positioning satellite 240 for synchronization. The internal GPS receiver 203 receives the signal transmitted by one or more Global Positioning Satellites 240 and relays the signal (e.g., time value) directly to the marker controller 206 of the marker system 10. The time value is used by the marker controller 206 to synchronize flashing of one or more of the LEDs 208.

Referring to FIGS. 10D, 10E, 10F, and 10G, schematic views of a multi-part helmet marker system of the flash synchronization system are shown. In some embodiments, a helmet marker system 10 is provided in multiple parts (see FIGS. 16-23) such as a left-side marker 304A and a right-side marker 304B. In split market systems, it is desired to synchronize both flashing and/or settings across all parts. For example, when the left-side marker 304A flashes, it is desired that the right-side marker 304B flash at the same time. Likewise, when the left-side marker 304A is set to flash using infrared wavelengths, it is desired that the right-side marker 304B flash at the same time with the same wavelength. In many embodiments, one or both of the left-side marker 304A and the right-side marker 304B will include switches 306A/306B (see FIGS. 16-23) that control the operation both the left-side marker 304A and the right-side marker 304B, for example, choosing a selected set of light emitting devices or emitters 322/324—for example IR emitters 322, white color emitters, etc.).

Note that the examples shown in FIGS. 10D-10G utilize Hall Effect or Reed switches (the Hall Effect/Reed sensor 320 shown in FIGS. 10D-10G) that include finger features that move a magnet 307A (see FIG. 22) either proximal or distant from the Hall Effect/Reed sensor 320. This system provides for reliable switch operation and hermetically sealing of the left-side markers 304A and the right-side markers 304B. This notwithstanding, any switching arrangement is anticipated and included herein. Additionally, it is fully anticipated that one of left-side marker 304A and the right-side marker 304B include the switches and the other of the left-side marker 304A and the right-side marker 304B be void of switches. FIGS. 10D-G show switches on each of the left-side marker 304A and the right-side marker 304B as an example.

Figure 10D:
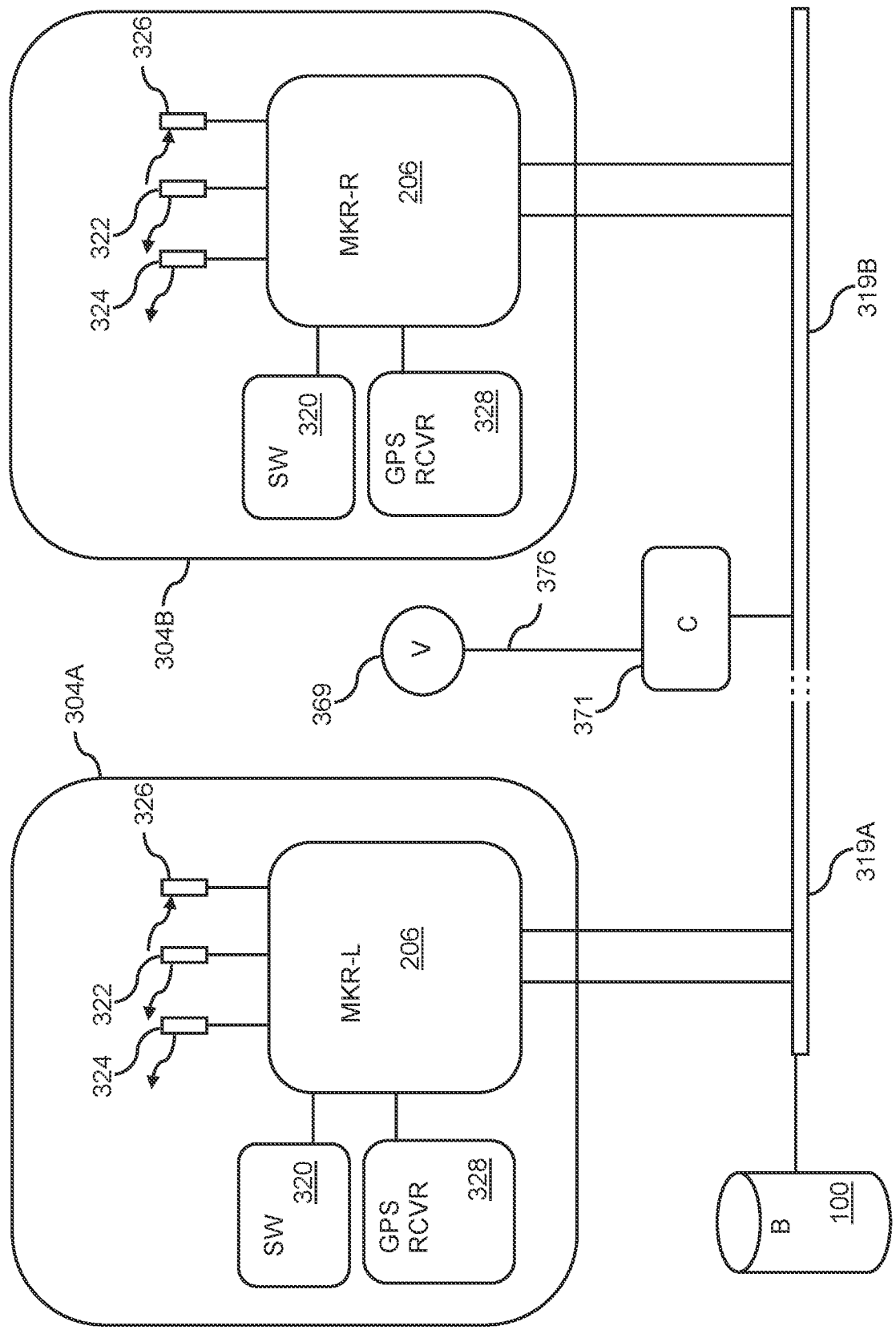
FIGS. 10D, 10E, 10F, and 10G illustrate schematic views of a multi-part helmet marker system of the flash synchronization system.
Figure 10E:
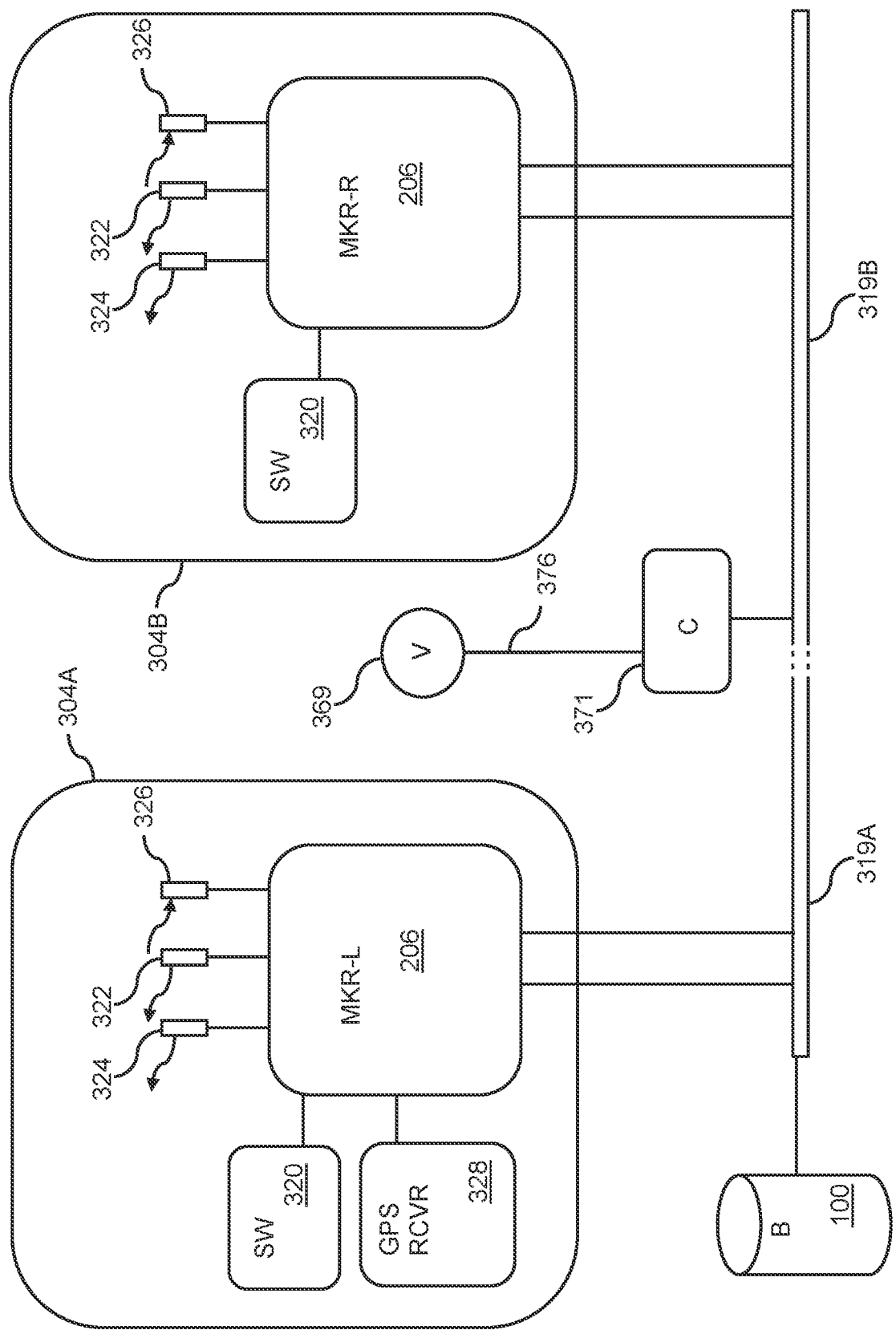

In some embodiments, the left-side marker 304A and the right-side marker 304B are mounted to helmet rails 319A/319B. Such helmet rails 319A/319B provide power to the left-side marker 304A and the right-side marker 304B from a power source that is a helmet-mounted battery and provides a wired data communications link between devices mounted to the helmet rails 319A/319B. In FIGS. 10D-10E, the left-side marker 304A communicates with the right-side marker 304B through a wired communications link of the helmet rails 319A/319B.

Each of FIGS. 10D-E show different configurations of global position satellite receivers 328/205. In FIG. 10D, each of the left-side marker 304A and the right-side marker 304B has a global position satellite receivers 328. In FIG. 10E, only one of the left-side marker 304A and the right-side marker 304B has a global position satellite receiver 328, while in FIG. 10F, neither of the left-side marker 304A and the right-side marker 304B have a global position satellite receivers 328 and there is an external global position satellite receiver 205 (e.g., a standalone global position satellite receiver or a global position satellite receiver of a tactical computer). In the later, timing signals from the global position satellite receiver 205 are communicated to the left-side marker 304A and the right-side marker 304B through the wired data communications link of the helmet rails 319A/319B.

Figure 10F:
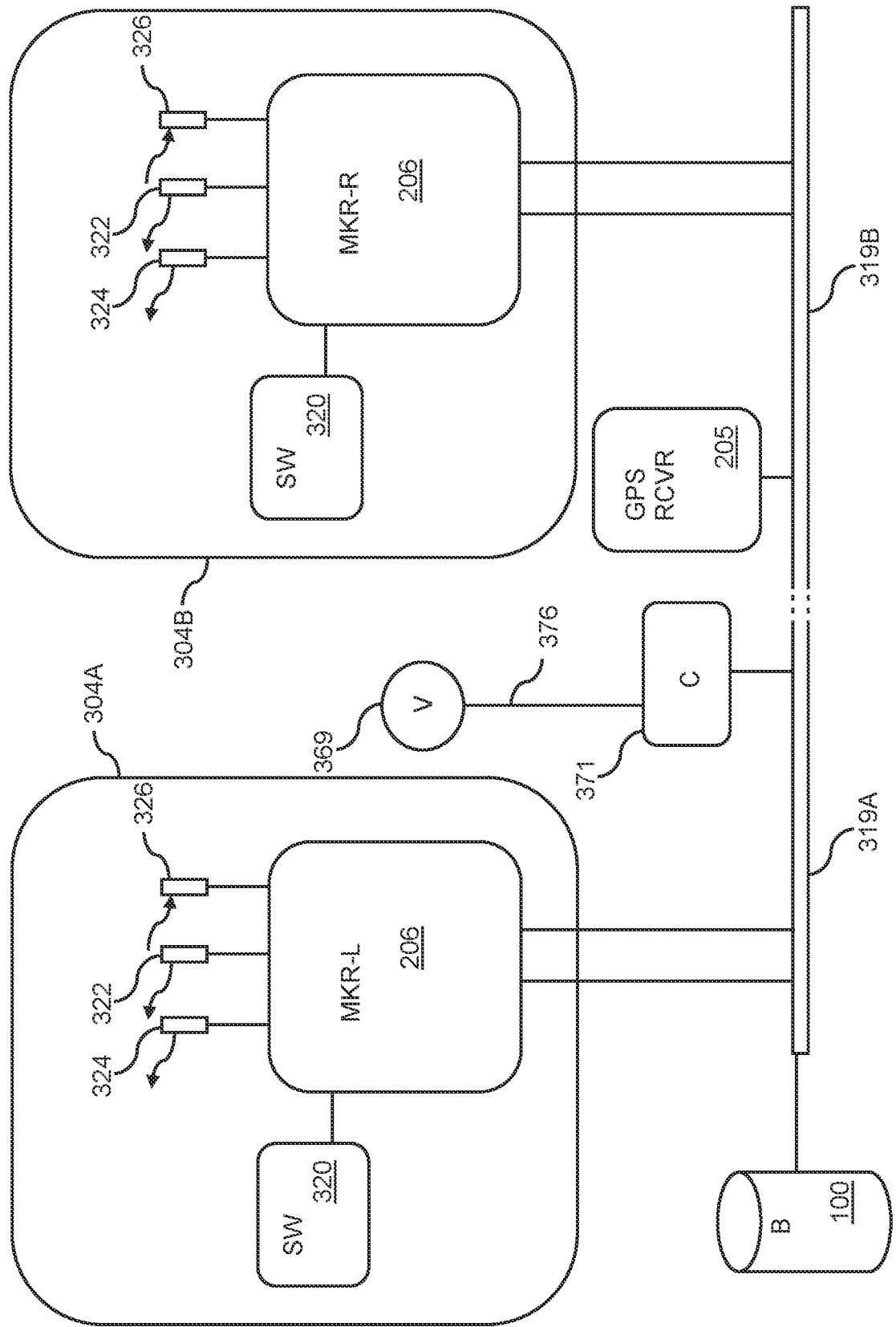
Figure 10G:
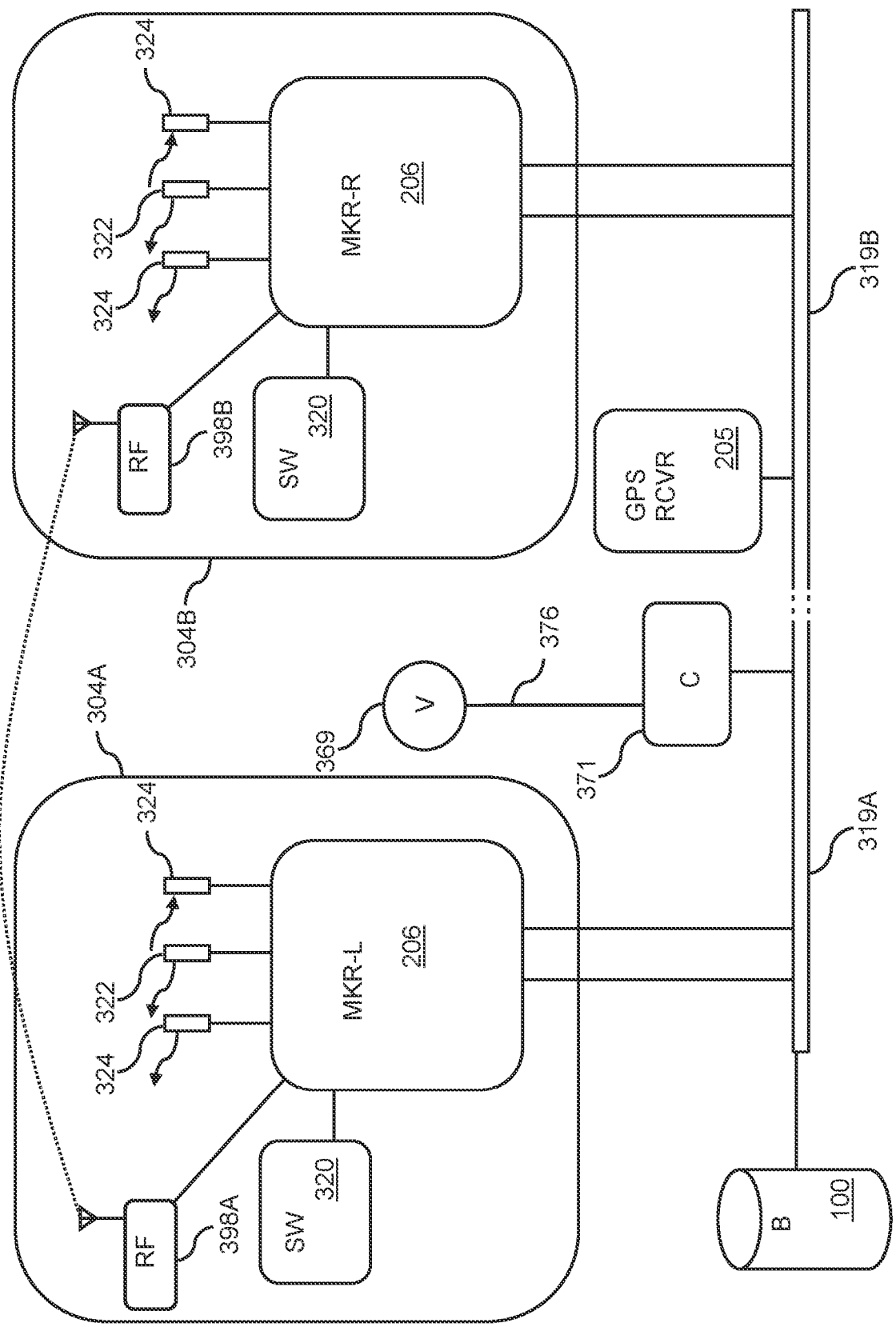

FIG. 10G shows one configuration using and external global position satellite receiver 205, though any of the prior global position satellite receivers 328/205 are anticipated and not shown for brevity and clarity reasons. In FIG. 10G, timing signals from the global position satellite receiver 205 are communicated to the left-side marker 304A and the right-side marker 304B through the wired data communications link of the helmet rails 319A/319B. Communications between the left-side marker 304A and the right-side marker 304B is performed by short-range radio frequency transceivers 398A/398B, one in each of the left-side marker 304A and the right-side marker 304B.

In all of the examples shown in FIGS. 10D-G, the left-side marker 304A and the right-side marker 304B communicate with each other to synchronize flashing and/or to synchronize settings. In the embodiment of FIGS. 10D, 10F, and 10G, there may or may not be a need to synchronize flashing since both the left-side marker 304A and the right-side marker 304B independently have or receive global positioning signals from the global position satellite receivers 328/205 that are either internal or external to the left-side marker 304A and the right-side marker 304B. In the embodiment of FIG. 10E, only one marker (for example, the left-side marker 304A) includes the global position satellite receivers 328 and, therefore, the left-side marker 304A must communicate with the right-side marker 304B in order to synchronize flashing.

In all examples, various setting and, in some embodiments, identification-friend-or-foe (IFF), laser target designator, or range finder reception and responses, as applicable, are coordinated between the left-side marker 304A and the right-side marker 304B either through the wired data communications link of the helmet rails 319A/319B or the short-range radio frequency transceivers 398A/398B. Such settings include, but are not limited to, flashing on/off, flashing rate, and flashing wavelength (e.g., visible or infrared). For example, if a switch (e.g., operated by a switch handle 306A) on the left-side marker 304A is set to "infrared," then the left-side marker 304A emits infrared flashing (e.g., energizing an infrared emitter 322—see FIG. 22) and the left-side marker 304A signals the right-side marker 304B to emit infrared, signaling the right-side marker 304B by either the wired data communications link of the helmet rails 319A/319B or by short-range radio frequency transceivers 398A/398B. In some embodiments, a data packet is transmitted from the left-side marker 304A to the right-side marker 304B.

In embodiments having identification-friend-or-foe (IFF) when one or both of the left-side marker 304A and the right-side marker 304B receive and identify the identification-friend-or-foe (IFF) signal, the receiving marker (left-side marker 304A or the right-side marker 304B) communicate to the other marker to properly respond with the proper "Friendly" response. In some embodiments, it is best that both sides emit the "Friendly" response while in other embodiments; only one side emits the "Friendly" response. When both sides emit the "Friendly" response, it is desired that the "Friendly" response be synchronized being that the "Friendly" response is often encoded to prevent spoofing and if both sides are not synchronized, it would be possible that the encoding gets scrambled. In embodiments where only infrared reception warning is needed, such as laser target designator and range finders sources, there is likely to be no external response emitted from the marker device.

Figure 11:
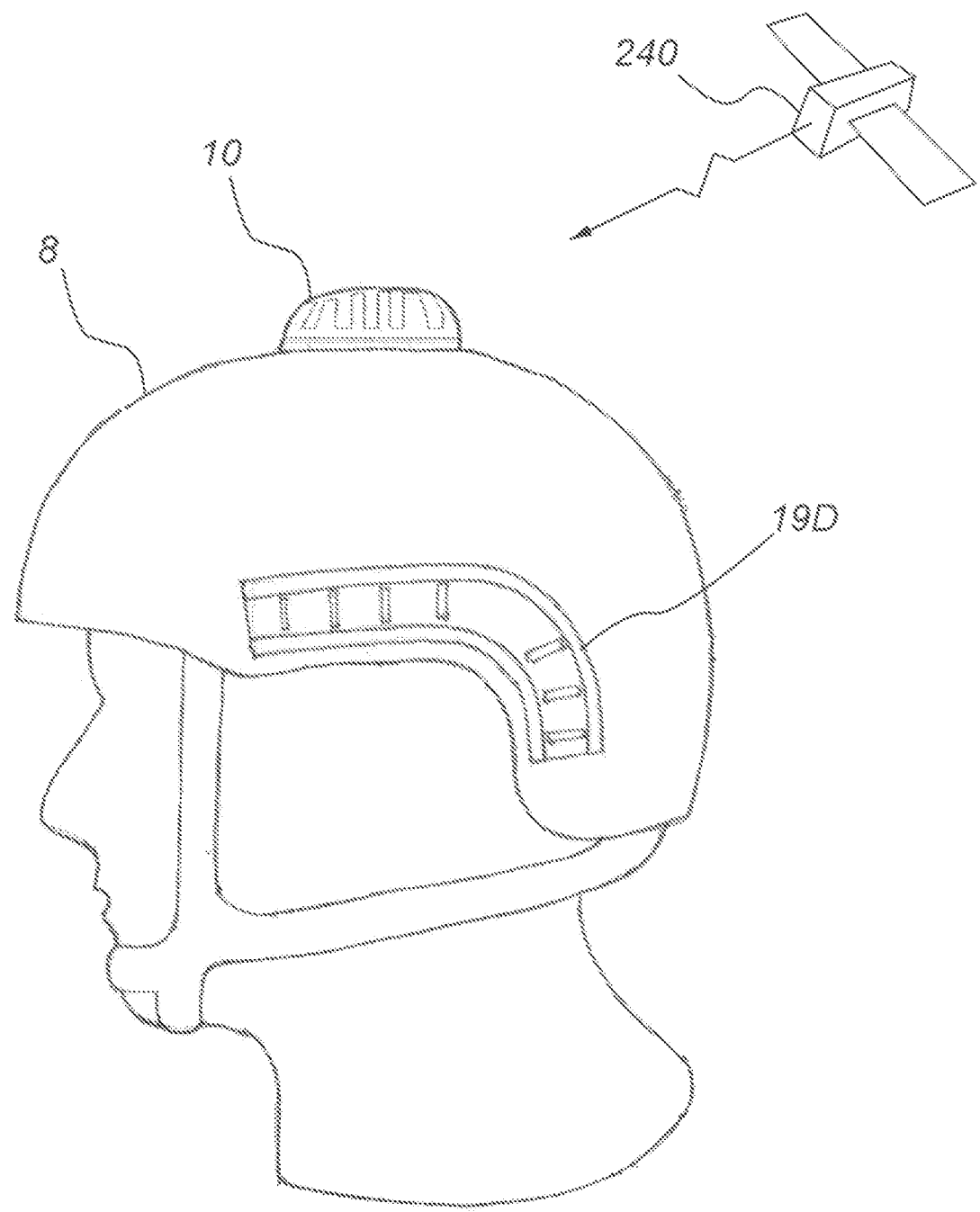
FIG. 11 illustrates a view of the helmet with a marker system deriving power/data from an internal power source and internally receiving and processing a time value signal from a GPS satellite.

Referring to FIG. 11, a view of the helmet 8 with a marker system 10 deriving power from a power storage device 202 and internally receiving a signal from a Global Positioning Satellites 240 (as shown in FIG. 10C) is shown. The power/data rail 19D is not used in this example.

In this example, the internal GPS receiver 203 is internal to the marker system 10, directly receiving the radio frequency signal transmitted by one or more Global Positioning Satellites 240 as shown in FIG. 10C and communicating with the marker controller 206 to synchronize flashing of the LEDs 208.

Figure 12:
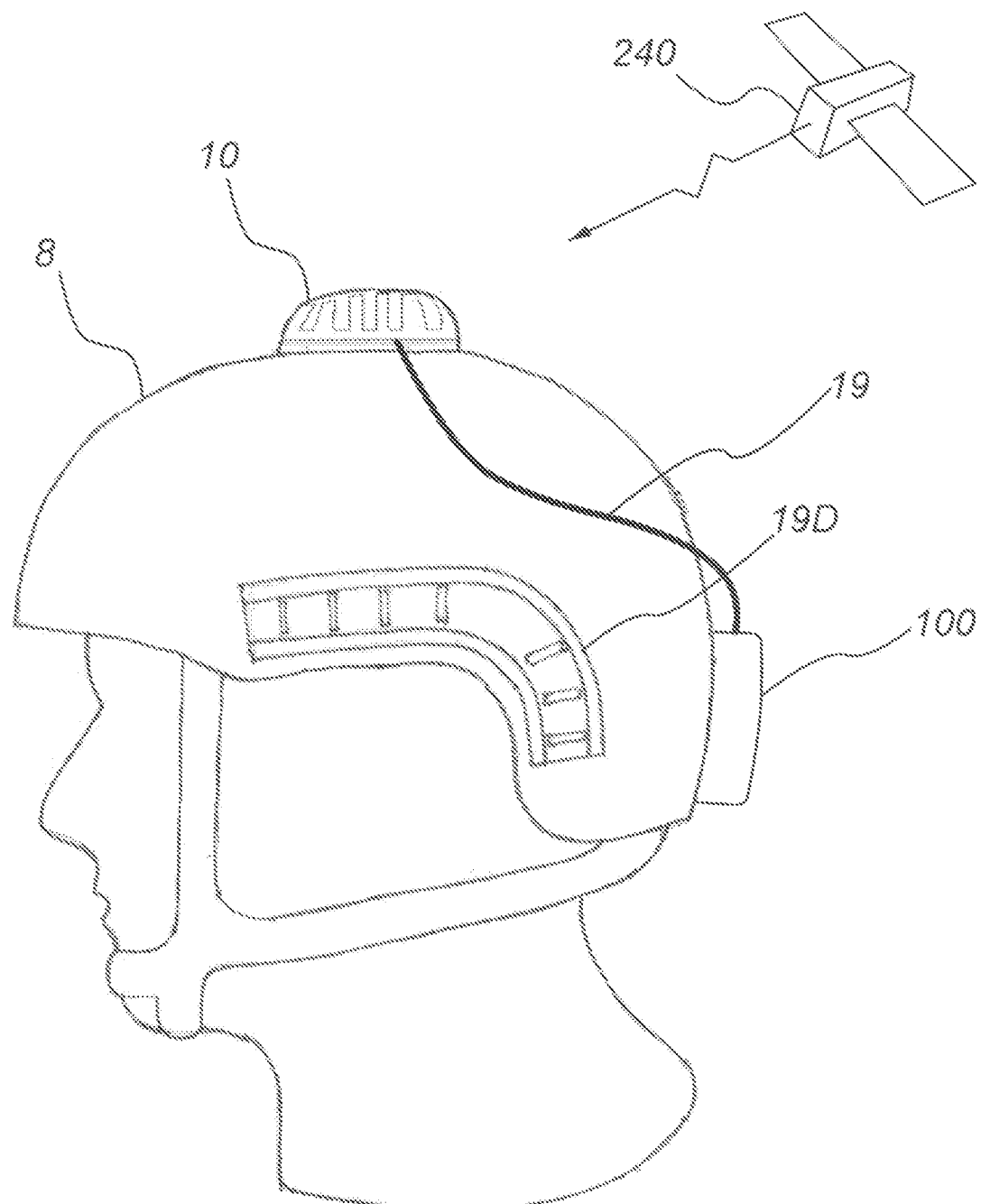
FIG. 12 illustrates a view of the helmet with a marker system deriving power from an external power source and internally receiving and processing a time value signal from a GPS satellite.

Referring to FIG. 12, a view of the helmet 8 with a marker system 10 deriving power from a power source 100 (external power supply) and internally receiving a signal from a Global Positioning Satellites 240 (as for example, in FIG. 10A) is shown.

In this example, the internal GPS receiver 203 is internal to the marker system 10, directly receiving the radio frequency signal transmitted by one or more Global Positioning Satellites 240 as shown in FIG. 10A.

Power is provided from a power source 100 through a power cable 19. The power source 100 is typically used to power other electronics mounted to the helmet 8 or external to the helmet 8. In this way, a single power source 100 provides power to multiple electronic devices, including the marker system 10, simplifying battery management to making sure one single power source 100 is fresh or fully recharged. In some embodiments, the power cable 19 directly connects to the marker system 10 while in some embodiments, the power from the power cable 19 is used to drive the power/data transmitting coil 17, transmitting power and/or data to the power/data receiving coil 11 on or in the marker system 10.

Figure 13:
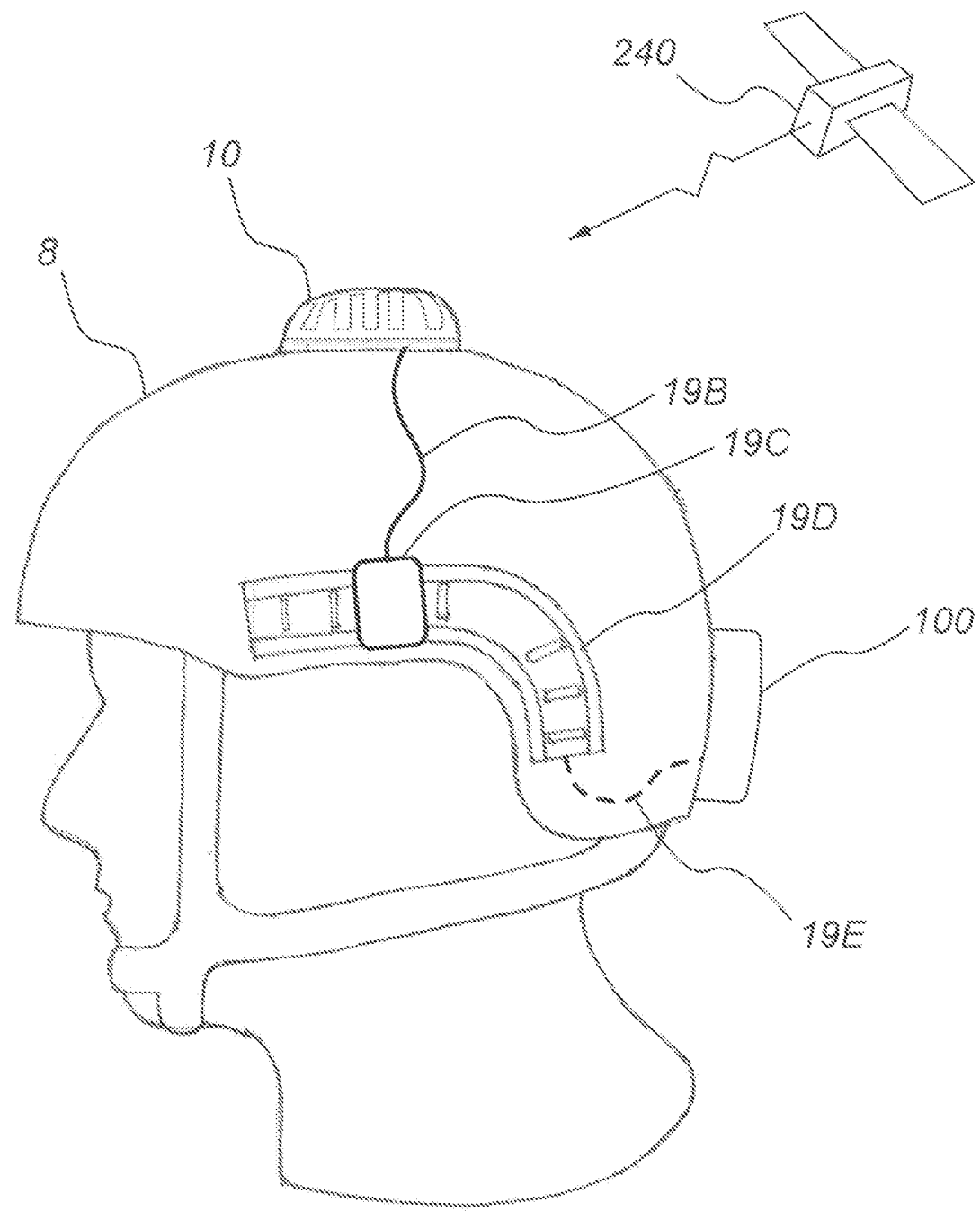
FIG. 13 illustrates a view of the helmet with a marker system deriving power from an external power source through a power/data rail and internally receiving and processing a time value signal from a GPS satellite.

Referring to FIG. 13, a view of the helmet 8 with a marker system 10 deriving power from a power source 100 through a power/data rail 19D and internally receiving a radio frequency signal from one or more Global Positioning Satellites 240 is shown.

In this example, the internal GPS receiver 203 is internal to the marker system 10, directly receiving the radio frequency signal transmitted by one or more Global Positioning Satellites 240 as shown in FIG. 10A.

Power and/or data is provided from a power source 100 through a power cable 19E that connects to a power/data rail 19D. A connector 19C on the power rail provides power to a power/data cable 19B. The power source 100 is typically used to power other electronics mounted to the helmet 8 or external to the helmet 8 through the power/data rail 19D. In this way, a single power source 100 provides power to multiple electronic devices, including the marker system 10, simplifying battery management to making sure one single power source 100 is fresh or fully recharged. In some embodiments, the power/data cable 19B directly connects to the marker system 10 while in some embodiments, the power from the power/data cable 19B is used to drive the power/data transmitting coil 17, transmitting power to the power/data receiving coil 11 on or in the marker system 10.

Figure 14:
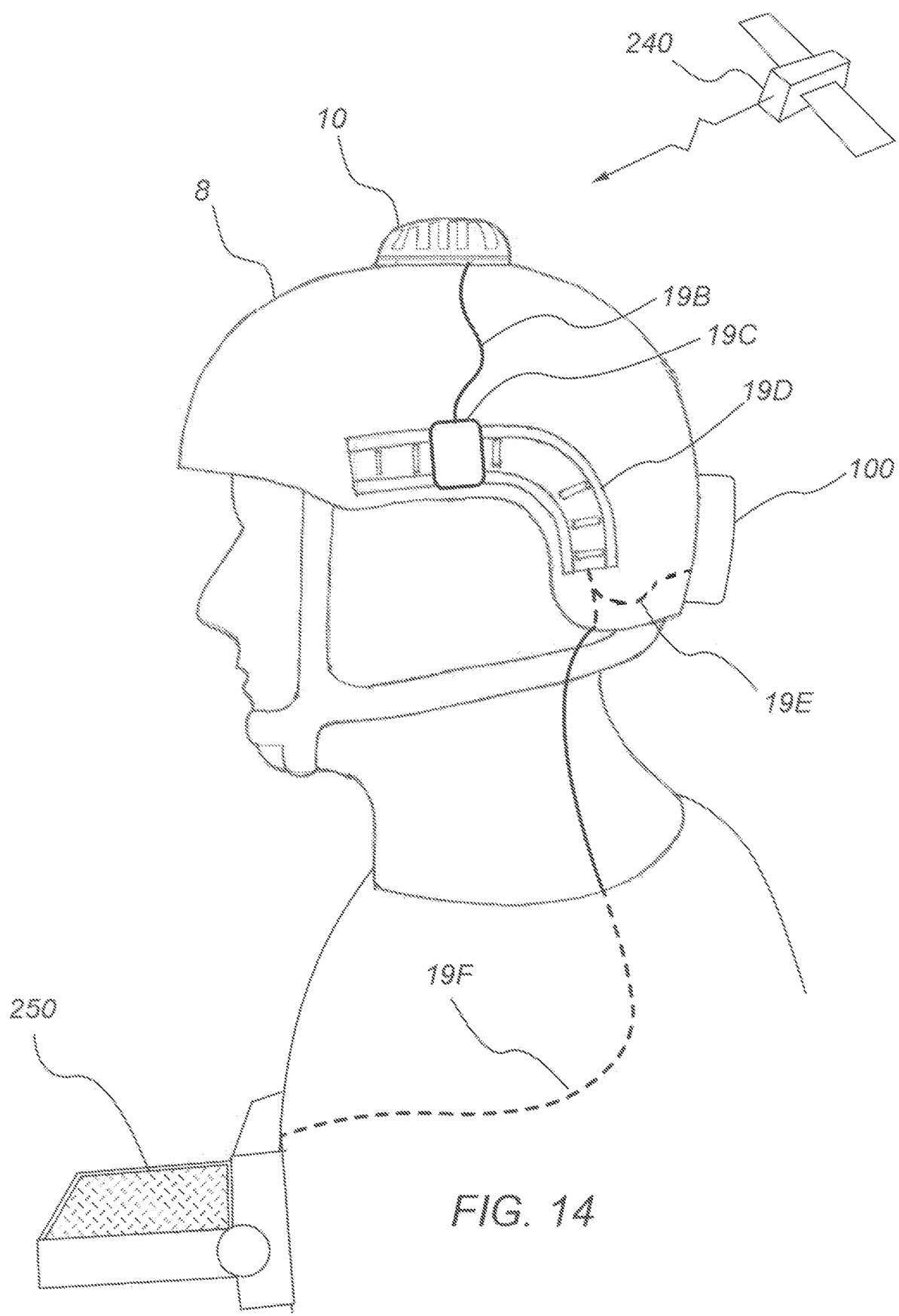
FIG. 14 illustrates a view of the helmet with a marker system deriving power from an external power source and receiving and processing a time value signal from an external GPS receiver mounted in an external tactical computer through a power/data rail.

Referring to FIG. 14, a view of the helmet 8 with a marker system 10 deriving power from a power source 100 and receiving a radio frequency signal from an external GPS receiver through a power cable 19E is shown.

In this example, the external GPS receiver 205 is external to the marker system 10, located in, for example, a tactical computer 250 that includes a receiver for directly receiving the radio frequency signal transmitted by one or more Global Positioning Satellites 240 as shown in FIG. 10B. The signal from the receiver is relayed through a signal or signal/power cable 19F to the power/data rail 19D, then through the connector 19C and power/data cable 19B to the marker system 10, where the signal is used in timing of light flashes from the marker system 10.

Power is provided from a power source 100 through a power cable 19E that connects to a power/data rail 19D. A connector 19C on the power/data rail provides power/data to a power/data cable 19B. The power source 100 is typically used to power other electronics mounted to the helmet 8 or external to the helmet 8 through the power/data rail 19D. In this way, a single power source 100 provides power to multiple electronic devices, including the marker system 10, simplifying battery management to making sure one single power source 100 is fresh or fully recharged. In some embodiments, the power/data cable 19B directly connects to the marker system 10 while in some embodiments, the power from the power/data cable 19B is used to drive the power/data transmitting coil 17, transmitting power to the power/data receiving coil 11 on or in the marker system 10.

Figure 15:
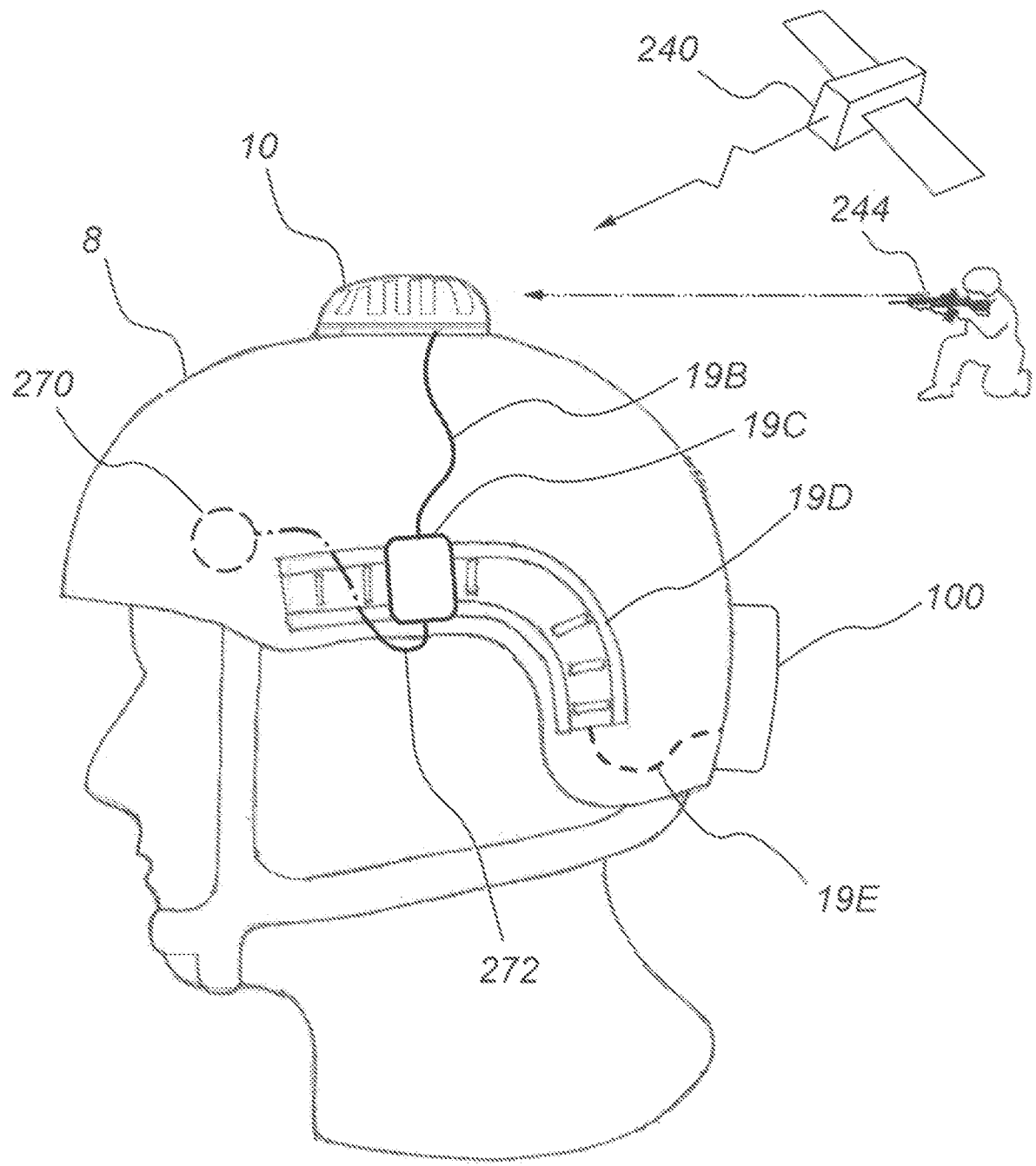
FIG. 15 illustrates a view of the helmet with a marker system deriving power from an external power source through a power/data rail, internally receiving and processing a time value signal from a GPS satellite, and signaling friend/foe to a friendly combatant subjected to IFF laser interrogation by friendly combatant via an infrared laser.

Referring to FIG. 15, a view of the helmet with a marker system deriving power from a power source 100 through a power rail, internally receiving a radio frequency signal from a Global Positioning Satellites 240, and signaling friend/foe to a friendly combatant 244 is shown.

In this example, the internal GPS receiver 203 is internal to the marker system 10, directly receiving the radio frequency signal transmitted by one or more Global Positioning Satellites 240 as shown in FIG. 10A.

Power is provided from a power source 100 through a power cable 19E that connects to a power/data rail 19D. A connector 19C on the power rail provides power/data to a power/data cable 19B. The power source 100 is typically used to power other electronics mounted to the helmet 8 or external to the helmet 8 through the power/data rail 19D. In this way, a single power source 100 provides power to multiple electronic devices, including the marker system 10, simplifying battery management to making sure one single power source 100 is fresh or fully recharged. In some embodiments, the power/data cable 19B directly connects to the marker system 10 while in some embodiments, the power and/or data from the power/data cable 19B is used to drive the power/data transmitting coil 17, transmitting power to the power/data receiving coil 11 on or in the marker system 10.

Figure 16:
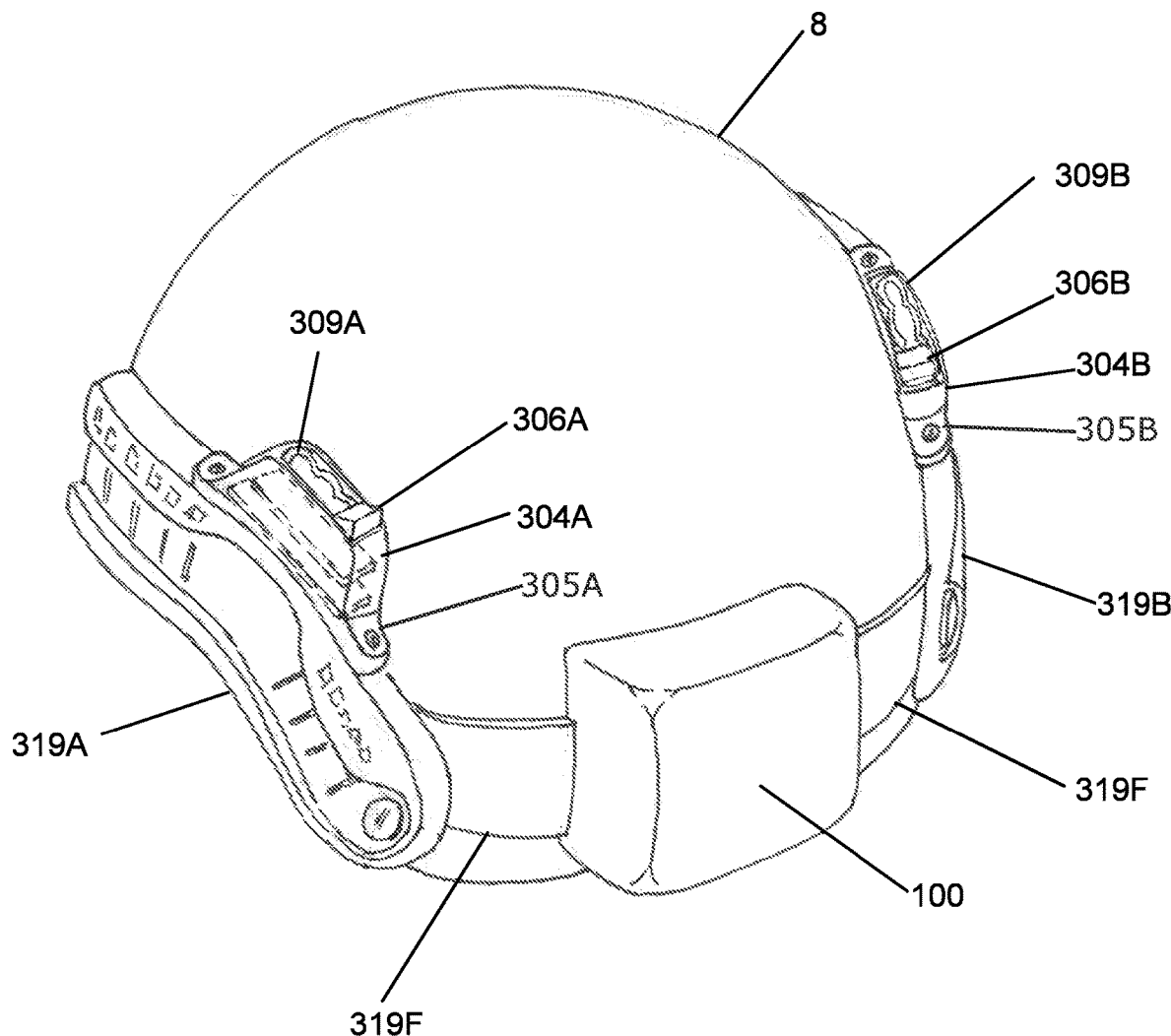
FIG. 16 illustrates a rear view of the helmet with a multi-part marker system.
Figure 17:
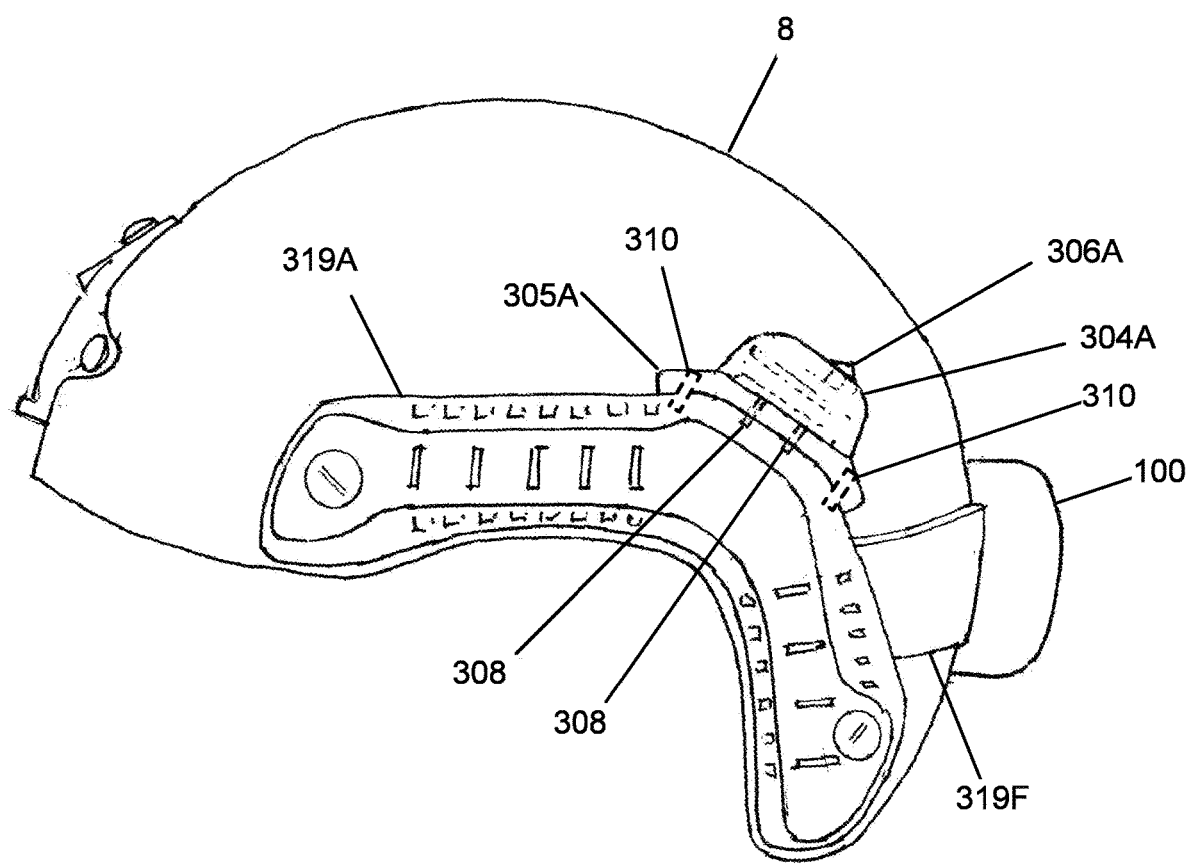
FIG. 17 illustrates a left-side view of the helmet with a multi-part marker system.
Figure 18:
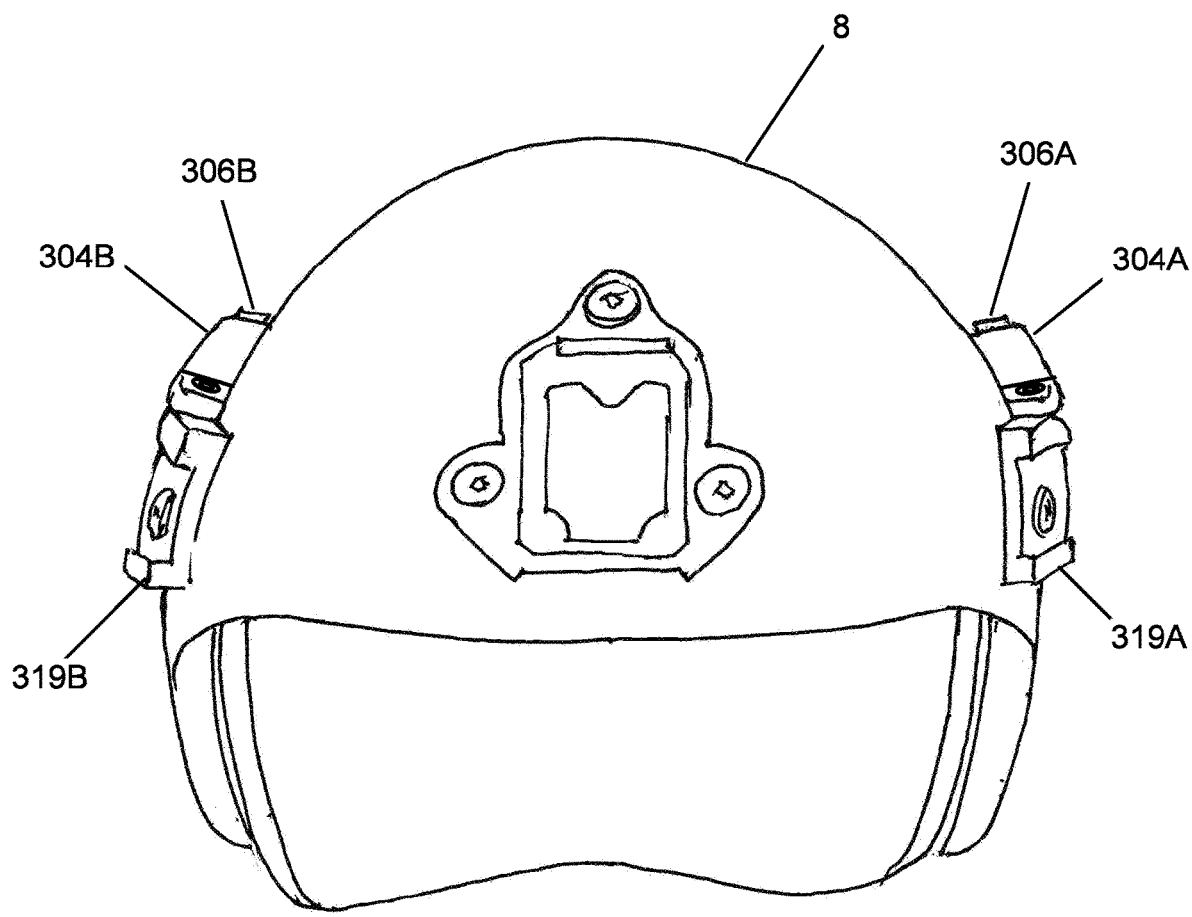
FIG. 18 illustrates a front view of the helmet with a multi-part marker system.

Referring to FIGS. 16, 17, and 18, views of the helmet 8 with a multi-part marker system 304A/304B are shown. In this embodiment, the left-side marker 304A and a right-side marker 304B are shown electrically interfaced to respective left-side rail 319A and right-side rail 319B, held by fasteners 310 connecting the base 305A/305B of each of the multi-part marker system 304A/304B to a respective rail 319A/319B. Note that it is also anticipated that the left-side marker 304A and a right-side marker 304B be directly affixed to the helmet 8 and connected by wires to each other and/or to power. Again, the marker system is shown as two pieces, a left-side marker 304A and a right-side marker 304B, though any number of pieces are anticipated with any division of switches, emitters, and infrared sensors. Also, in some embodiments, one, several, or all pieces include some form of power storage such as a backup battery, rechargeable battery, super capacitor, etc.

The power source 100 (e.g., battery) connects to both the left-side rail 319A and right-side rail 319B by an interface 319F (e.g., cable, flat cable). In embodiments in which the left-side rail 319A and right-side rail 319B include a wired communications interface, the interface 319F also connects the wired communications interface between the left-side rail 319A and right-side rail 319B.

In FIG. 16, a selector switch 306A is shown. The switch handle 306A slides within a track 309A and controls one or more operations of both the left-side marker 304A and a right-side marker 304B (e.g., on/off, flashing rate, flashing wavelength . . . ). In some embodiments, the selector switch 306A includes a magnet 307A (see FIG. 22) that activates/deactivates one or more Hall Effect/Reed sensors.

Figure 19:
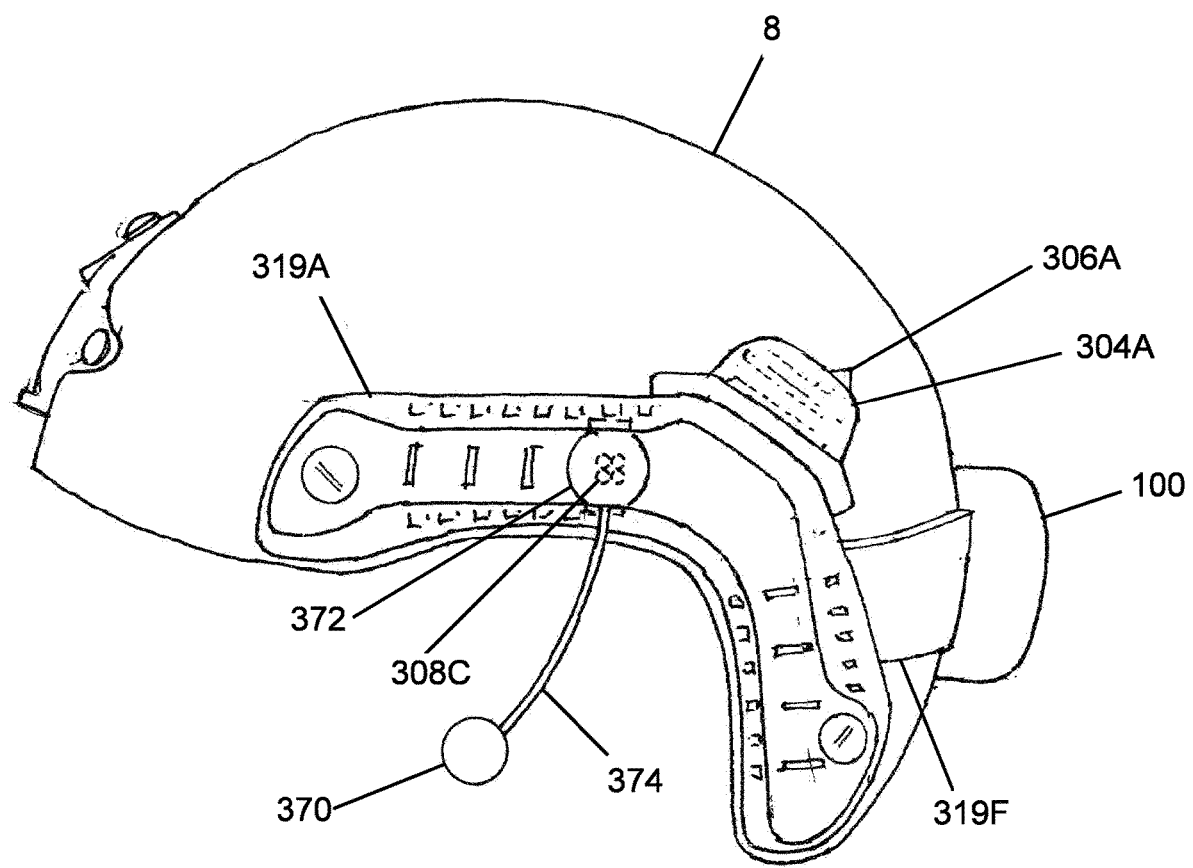
FIG. 19 illustrates a left-side view of the helmet with a multi-part marker system with vibrator interfaced to a connector of the left rail.
Figure 20:
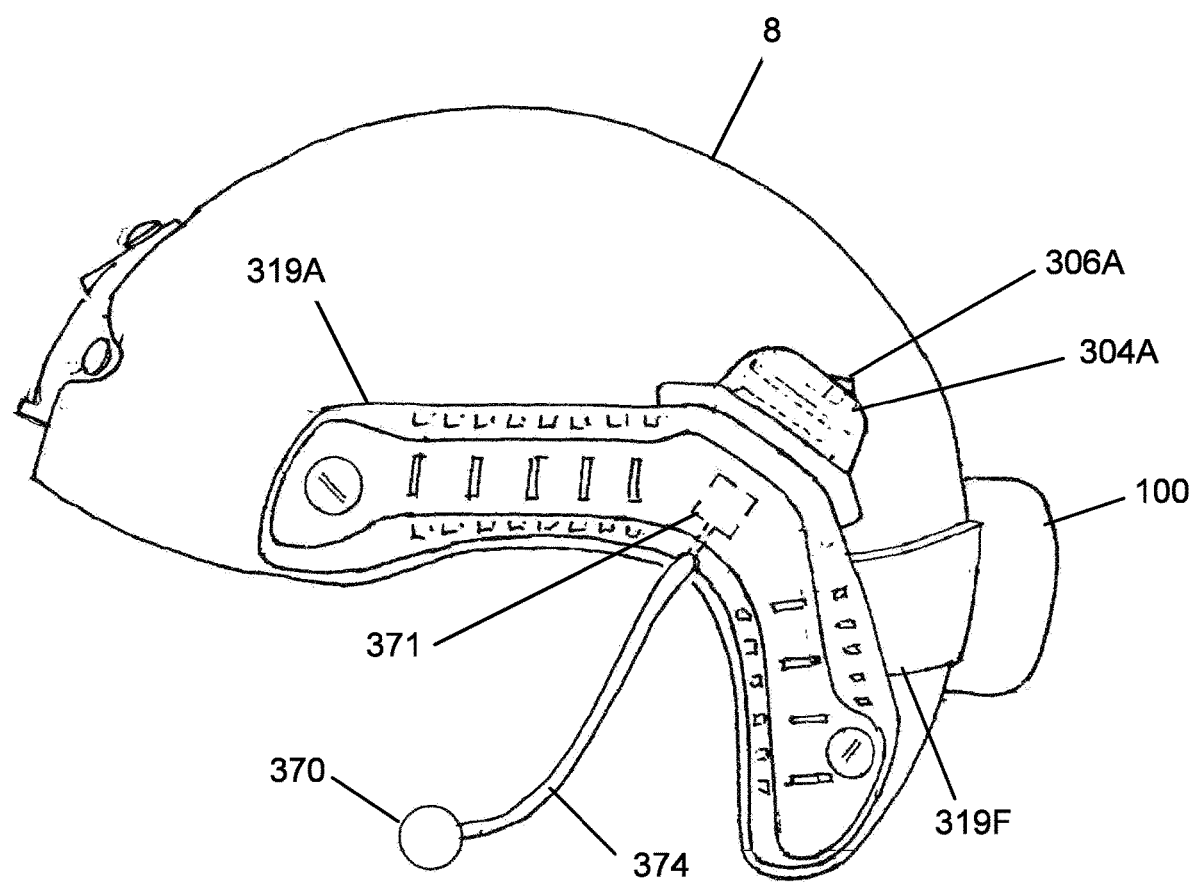
FIG. 20 illustrates a left-side view of the helmet with a multi-part marker system with vibrator interfaced directly to a circuit within the left rail.
Figure 21:
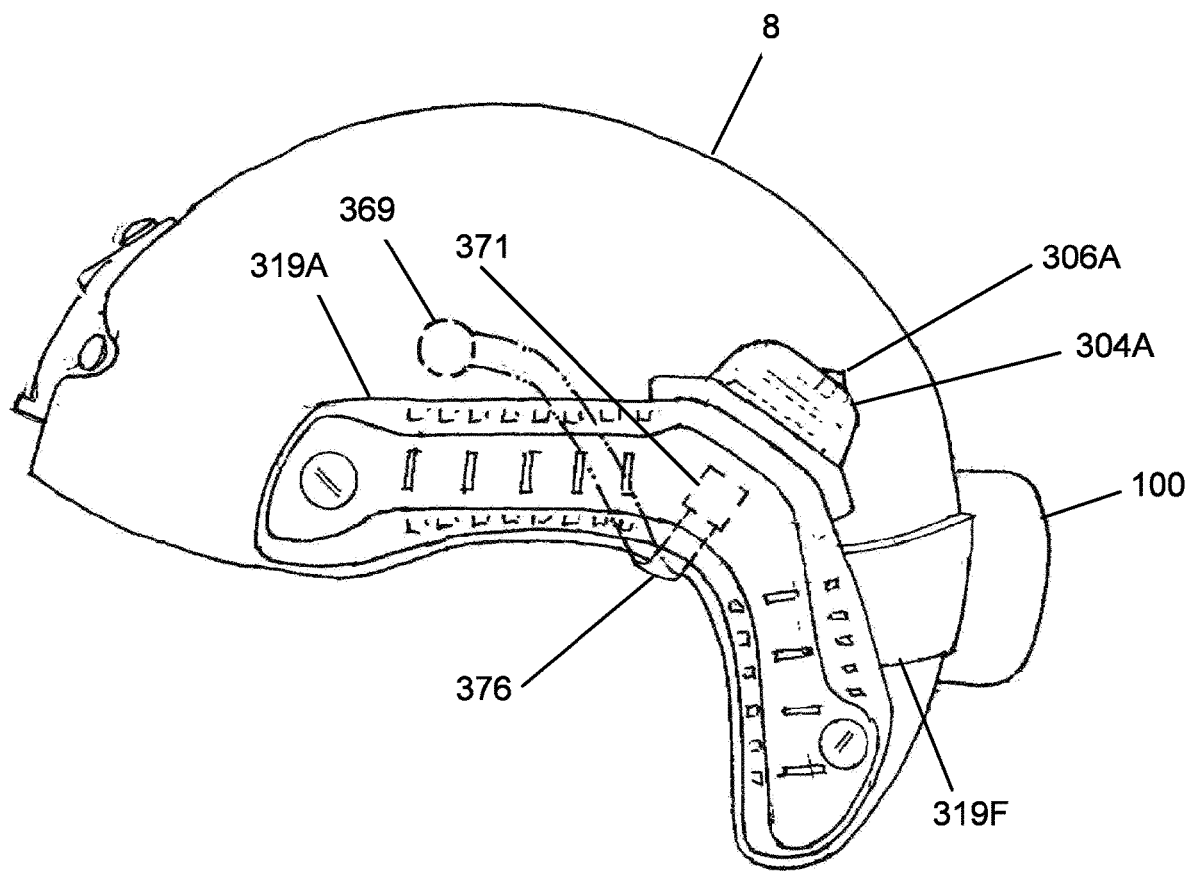
FIG. 21 illustrates a left-side view of the helmet with a multi-part marker system with vibrator integrated into the helmet and interfaced directly to a circuit within the left rail.

Referring to FIGS. 19, 20, and 21, views of the helmet 8 with the multi-part marker system 304A/304B with vibrating device 369/370 are shown.

In FIG. 17, a partial cross-sectional view of the left-side marker 304A shows several interface pins 308. Each marker 304A/304B electrically interfaces with the respective rail 319A/319B for power and/or wired communications between the marker parts and/or other components interfaced to the rail 319A/319B such as an external global position satellite receiver 205 or a tactical computer, etc.

In FIG. 18, the front of each marker 304A/304B is visible along with their respective selector switches 306A/306B though in some embodiments, the number of selector switches 306A/306B vary; for example, no selector switches (e.g., when using a remote control), a single selector switch in the left-side marker 304A or in the right-side marker 304B, two selector switches, one in each of the left-side marker 304A and a right-side marker 304B, etc. Also visible in FIG. 18 is the front edge of the left-side rail 319A and the right-side rail 319B.

In FIGS. 19-21, various embodiments of a vibrating device 369/370 are shown. Note that the vibrating device 369/370 is optional and it is anticipated that in some embodiments, the markers 304A/304B function without the vibrating device 369/370 and in some embodiments, the markers 304A/304B function with the vibrating device 369/370, providing haptic feedback to a wearer of the helmet 8, for example, upon reception of an incoming IFF, laser target designator, or range finder signal.

In FIG. 19, the vibrating device 370 is attached by a cable 374 that has an interface 372 that plugs into a receptacle 308C of one of the rails 319A/319B (shown connected to the left-side rail 319A). When worn, the vibrating device 370 is positioned under the helmet to contact the wearer's head and provide haptic feedback.

In FIG. 20, the vibrating device 370 is attached and electrically connected by a cable 374 that connects directly to an interface 371 integrated into one of the rails 319A/319B (shown interfaced to the left-side rail 319A). Again, when worn, the vibrating device 370 is positioned under the helmet to contact the wearer's head and provide haptic feedback.

In FIG. 21, there is an integrated vibrating device 369 built or integrated into the helmet 8. The integrated vibrating device 369 is electrically connected to the interface 371 that is integrated into one of the rails 319A/319B (shown interfaced to the left-side rail 319A) by a flat cable 376. Again, when worn, the vibrating device 370 is positioned under the helmet to contact the wearer's head and provide haptic feedback.

In the above embodiments of vibrating devices 369/370, the interfaces 371/372 provide power to the vibrating devices 369/370 as well as decode wired networking signals from the rails 319A/319B (e.g., the left-side rail 319A), providing command and control to other devices interfaced to the rails 319A/319B such as the marker 304A/304B.

Figure 22:
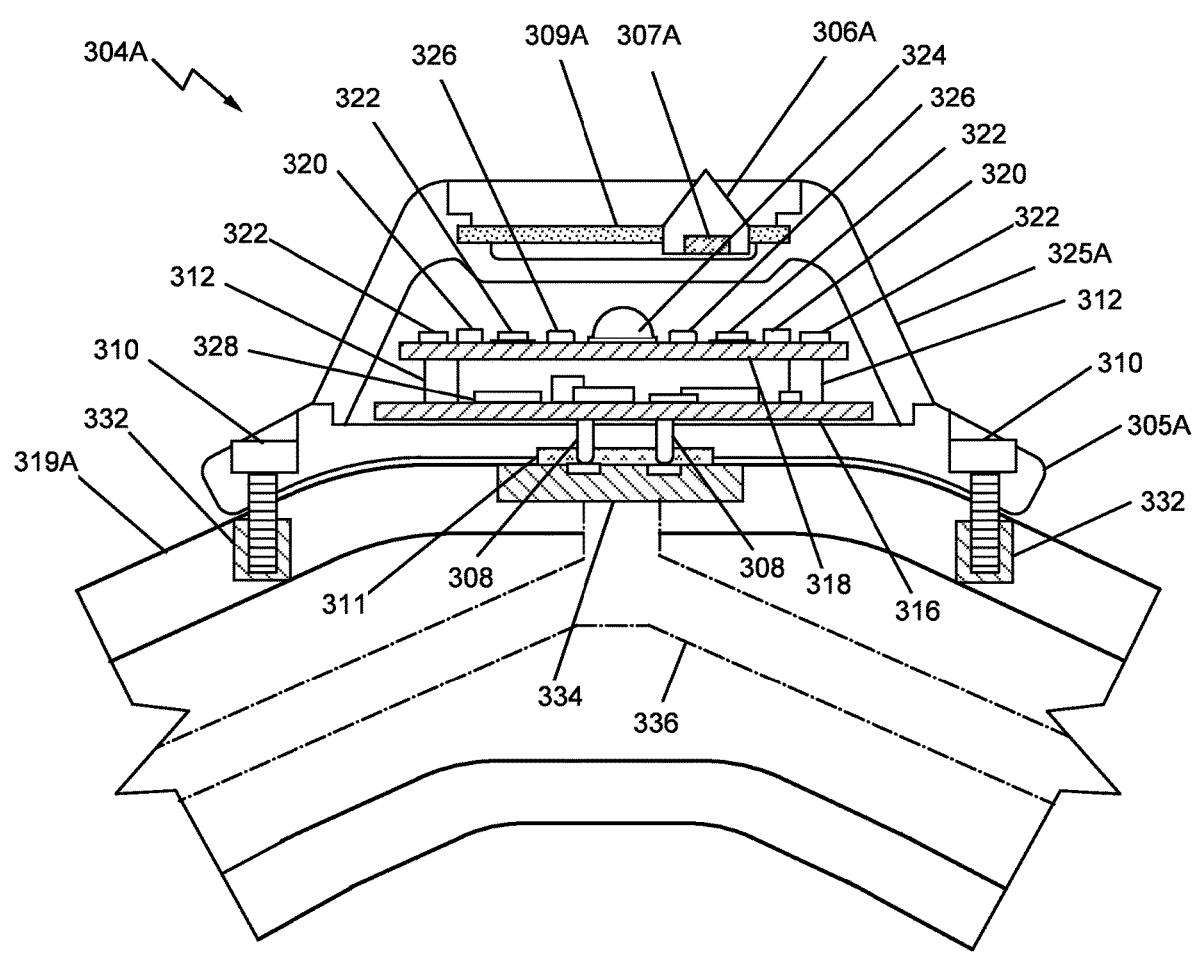
FIG. 22 illustrates a cross section view of a left-side marker of a multi-part marker system.
Figure 23:
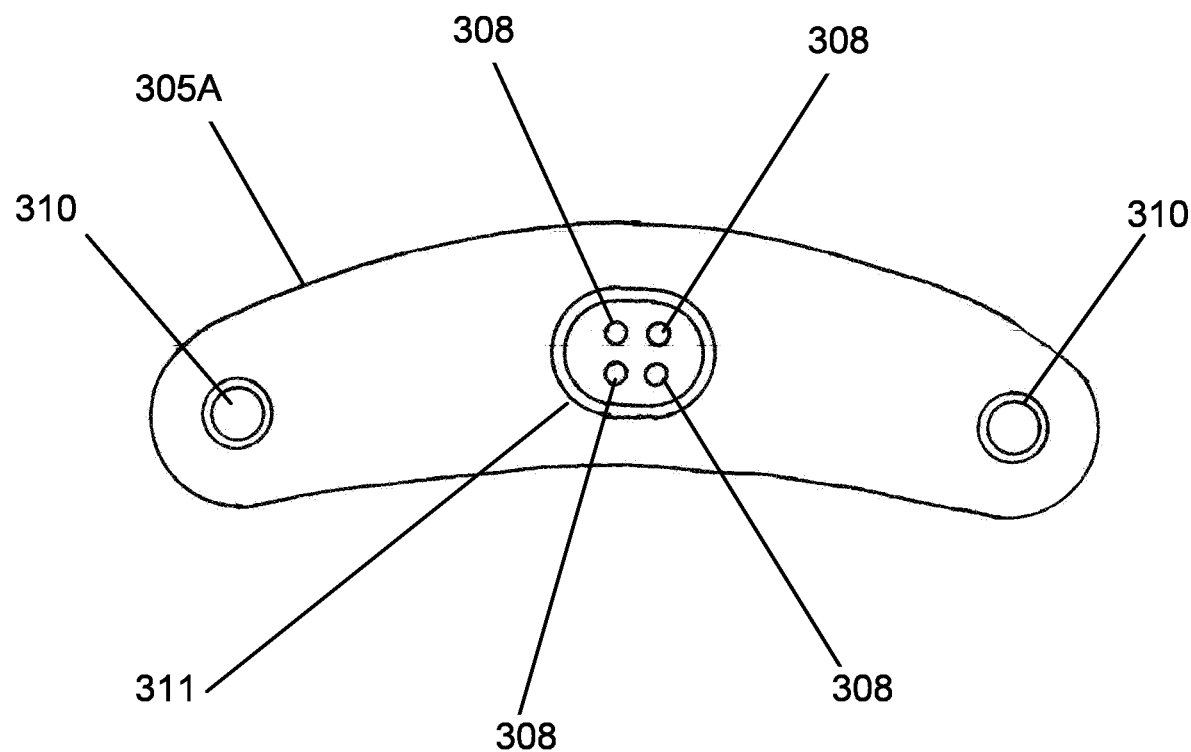
FIG. 23 illustrates a bottom view of a left-side marker of a multi-part marker system.

Referring to FIGS. 22 and 23, a cross-section view (FIG. 22) and a bottom view (FIG. 23) of a left-side marker 304A of a multi-part marker system 304A/304B are shown. The right-side marker 304B is anticipated to be somewhat symmetrical except, in some embodiments, lacking the global position satellite receiver 328 and/or having slightly different switch handles 306A.

In FIG. 22, the left-side marker 304A is shown being interfaced to the left-side rail 319A, interface pins 308 inserting into a rail connector 334 that connects to a bus 336 internal to the left-side rail for carrying power and/or wired data. As an example, the base of the left-side marker 304A is held to the left-side rail 319A by fasteners 310, though the present invention is not limited to any particular mounting configuration or type of fastener.

The internal components are mounted to one or more circuit boards 316/318, though any number of circuit boards is anticipated.

In this embodiment, the upper circuit board 318 includes zero or more visible emitters 324 (e.g., white LEDs, RGB LEDs, RGB/White LEDs), zero or more infrared emitters 322 (e.g., IR LEDs), zero or more infrared sensors 326 (e.g., NIR and/or SWIR), and one or more Hall Effect/Reed sensor 320. The Hall Effect/Reed sensor 320 detect a magnet 307A that is embedded in the switch handle 306A as it slides along the track 309A to provide control input to the control circuit 330 (e.g., ASIC, PLA, processor). In embodiments in which the global position satellite receiver 328 is included within the marker system 304A/304B, the global position satellite receiver 328 is mounted on the lower circuit board 316, though any location is anticipated. It is understood that any and all components can be mounted on one or more circuit boards.

The circuitry is protected from humidity/moisture by a hermetic seal between the base and a translucent/transparent cover 325A.

In FIG. 23, the bottom of the base 305A of the left-side marker 304A is shown having interface contacts 308 that interface with a connector of the left-side rail 319A. Note that although four interface contacts 308 are shown (two for power and two for wired communications), any number of interface contacts 308 are anticipated. In some embodiments these interface contacts 308 are spring-loaded pins. In some embodiments, a seal 311 is provided to protect the interface contacts 308 (and rail connector 334) from the elements.

Figure 24:
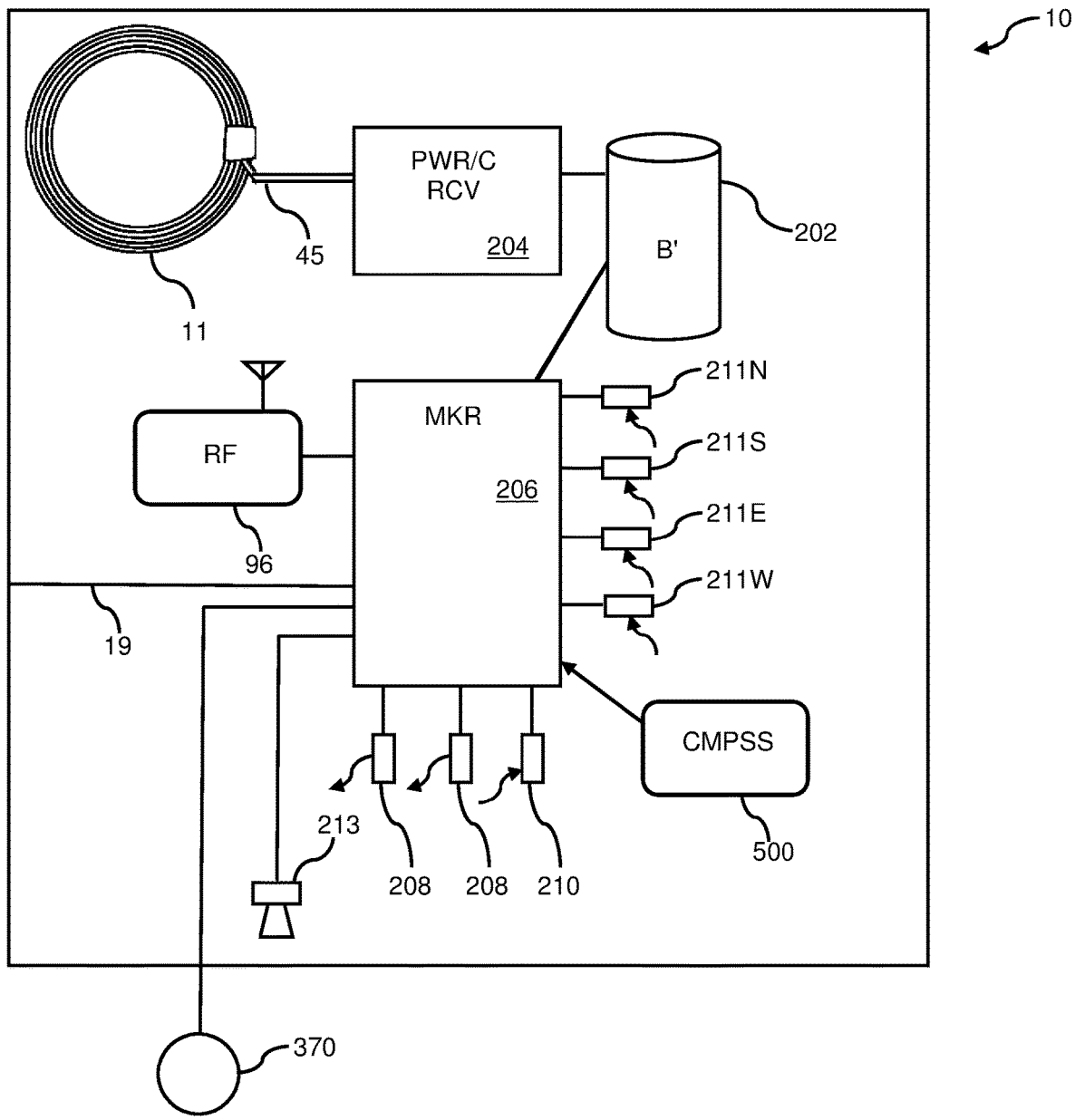
FIG. 24 illustrates a block diagram of a marker with infrared detection.

FIG. 24 illustrates a block diagram of a marker 10 with infrared detection. In FIG. 24, the power reception system of the marker system 10 is shown for completeness, including the power/data receiving coil 11, the power/data receiver circuit 204, and a power storage device 202 such as a rechargeable or non rechargeable battery (removable or fixed), a super capacitor, etc.

In the example shown, the marker system 10 is shown in a simple form, having a marker controller 206 that selectively illuminates one or more LEDs 208 and, optionally, receives indications from one or more light detecting elements 210 (e.g., interrogation requests). As described, the marker controller includes circuitry to illuminate each of the one or more LEDs 208 in any combination, sequence, and timing as described above.

In this embodiment, there are infrared detectors 211N/211S/211E/211W for detecting infrared radiation from an external source such as a laser target designator system or range finder. By detecting such infrared radiation, the wearer of the marker 10, and in some embodiments, others around the wearer of the marker 10, are notified of the detected infrared radiation. In some embodiments, only a single infrared detector (e.g., only the north infrared detector 211N) is provided for receiving the infrared radiation through the enclosure 16 of the marker 10. Although any number of infrared detectors are anticipated, in other embodiments, at least two infrared detectors and in some embodiments, four infrared detectors 211N/211S/211E/211W are provided, preferably aimed in different directions around the marker 10 for receiving the infrared radiation through the top enclosure 16 of the marker 10. In the example shown, four infrared detectors 211N/211S/211E/211W are provided. Although compass headings are used to describe the locations of the infrared detectors 211N/211S/211E/211W, there is no limitation as to the aiming and/or directionality of the infrared detectors 211N/211S/211E/211W. In one embodiment, a north infrared detector 211N is positioned to receive infrared radiation through the front of the enclosure 16 of the marker 10, a south infrared detector 211S is positioned to receive infrared radiation through the back of the enclosure 16 of the marker 10, an east infrared detector 211E is positioned to receive infrared radiation through the right-side of the enclosure 16 of the marker 10, a west infrared detector 211W is positioned to receive infrared radiation through the left side of the enclosure 16 of the marker 10. In such an arrangement, the marker controller 206 will receive a signal from each of the four infrared detectors 211N/211S/211E/211W at any given time and the marker controller 206 determines a directionality of the infrared radiation by way of which of the infrared detectors 211N/211S/211E/211W have detected the infrared radiation and, in some embodiments, by the relative strength of the infrared radiation as detected by two or more infrared detectors 211N/211S/211E/211W. For example, without having a signal strength, if only the north infrared detector 211N detects infrared radiation, then it is determined that the source of the infrared radiation is directly in front of the wearer (e.g., at zero degrees relative to the front of the enclosure). In this same example, if both the north infrared detector 211N and the east infrared detector 211E detects infrared radiation, then it is determined that the source of the infrared radiation is at 45 degrees relative to the front of the enclosure.

In some embodiments, the four infrared detectors 211N/211S/211E/211W have a signal strength indication. As an example of this embodiment, if the north infrared detector 211N detects a higher amount infrared radiation and the east infrared detector 211E detects a lower amount infrared radiation, then it is determined that the source of the infrared radiation is at, say 30 degrees relative to the front of the enclosure.

In some embodiments, each of the infrared detectors 211N/211S/211E/211W comprise a single sensor for detecting a certain range of infrared wavelengths as shown in FIG. 25. In some embodiments, each aimed set of the at least two infrared detector arrays 211 comprise multiple sensors for detecting different ranges of infrared wavelengths as shown in FIG. 26, such as those differing between IFF, laser target designator, and range finder type infrared sources.

When the marker controller 206 determines that an infrared signal has been received that is likely not a coded IFF infrared signal from a friendly source (e.g., laser target designator or range finder), the marker controller 206 signals or alerts to warn the wearer and, optionally, other people that are nearby so that the wearer and/or other people are able to take whatever evasive action might be possible. In such, the marker controller 206 emits a signal in any possible way to warn the wearer and, optionally, other people.

In some embodiments, the alert is made by vibrating a vibration device 270. In embodiments without directionality, as the vibration device 270 is often used for other signaling, it is anticipated that marker controller 206 modulates the vibration device 270 to inform the wearer that an incoming infrared reception was made (e.g., three short vibrations). In embodiments in which directionality is known, it is anticipated that the vibration of the vibration device 270 is modulated to inform the wearer of which direction the infrared signal emanates. For example, is anticipated that a first part of the modulation informs the wearer that an incoming infrared reception was made (e.g., three short vibrations), and in some embodiments that warning is followed by varying vibrational frequencies depending on the direction that the wearer is looking in the relative direction of the source of the incoming IR signal, the frequency of that vibration increases when looking in the direction of the source of incoming IR, and diminishes when the wearer looks away from the direction of the source. In embodiments in which there are multiple infrared sensors (e.g., sensors 211X1/211X2) the vibration is also encoded with an indication of the wavelength band of the infrared signal that was received (e.g., one long vibration for one wavelength range and two long vibrations for another wavelength band.

In some embodiments, the alert is made by an audible message through an audio output device 213 (e.g., headphone, speaker, earpiece). In embodiments without directionality, a message or tone is emitted from the audio output device 213 to inform the wearer that an incoming infrared reception was made (e.g., "warning laser range finder detected"). In embodiments in which directionality is known, it is anticipated that the message or tone informs the wearer of which direction the infrared signal emanates. For example, is anticipated that an audible warning message includes the directionality as best can be determined (e.g., "warning laser range finder detected coming from northeast).

In some embodiments, the signal drives a display for the wearer or other person to visualize the source of the infrared signal. For example, a heads-up display, or other wearer-worn display such a tactical computer 250.

In some embodiments, the alert is made by sending a wireless signal (e.g., a radio frequency signal) from the marker controller 206 by way of a wireless transmitter or transceiver (e.g., radio frequency transmitter of transceiver 96). In this, a signal is encoded to include an indication that an infrared signal was received along with any other information that is available such as direction and infrared band. In some embodiments, this signal is received locally by and displayed on a tactical computer 250 or on a heads-up display. In some embodiments, the signal is received by other designated team members in the vicinity of the wearer to warn these others that the infrared signal was received. In such, when a direction is also encoded in the signal, it is preferred that the direction be encoded as a true compass direction (e.g., 90 degrees is east), as a direction that is relative to the direction in which the wearer is facing is not useful to others that do not know which direction the wearer is facing. To facilitate such, in some embodiments, the marker includes an electronic compass 500 that is used to normalize the direction in which the marker is oriented to the true direction and the true direction is encoded into the signal transmitted by the radio frequency transmitter or transceiver 96.

In some embodiments, the warning includes sending a signal from the marker controller 206 by way of a wired interface 19. As above, a signal is encoded to include an indication that an infrared signal was received along with any other information that is available such as direction and band and send by wire to other devices such as a tactical computer. When this signal is received locally, for example, by the tactical computer 250, the warning is displayed on a display of the tactical computer 250 or displayed on a heads-up display. In some embodiments, it is preferred that the direction be encoded as a true direction (e.g., 0 degrees is north). To facilitate such, in some embodiments, the marker includes the electronic compass 500 that is used to normalize the direction in which the marker is oriented to the true direction and the true direction is encoded into the signal that is sent on the wired interface 19.

Referring to FIG. 25 and FIG. 26, schematic diagrams of a first infrared detector 211A and a second infrared detector 211B are shown. The first infrared detector 211A (FIG. 25) is limited to detecting the wavelengths of infrared radiation by a single sensor 211X1. It is known that specific infrared sensors can only detect certain ranges of infrared radiation such as one type being capable of detecting infrared wavelengths of less than 900 nm and another type being capable of detecting wavelengths in a range around 1064 nm and another type being capable of detecting wavelengths in a range around 1550 nm. For this reason, the second infrared detector 211B (FIG. 26) is able to detect a broader wavelength of infrared radiation by having at least two sensors 211X1 and 211X2 (e.g., at least two detectors that detect different wavelength ranges).

FIG. 27 illustrates a plan view of a marker 10 with infrared detection. Although any number of infrared detectors arranged in different viewing angles is anticipated, in this embodiment, there is a north infrared detector 211N is positioned to receive infrared radiation through the front of the top enclosure 16 of the marker 10, a south infrared detector 211S is positioned to receive infrared radiation through the back of the top enclosure 16 of the marker 10, an east infrared detector 211E is positioned to receive infrared radiation through the right-side of the top enclosure 16 of the marker 10, and a west infrared detector 211W is positioned to receive infrared radiation through the left side of the top enclosure 16 of the marker 10. The north infrared detector 211N has two infrared sensors 211N1/211N2, the south infrared detector 211S has two infrared sensors 211S1/211S2, the east infrared detector 211E has two infrared sensors 211E1/211E2, and the west infrared detector 211W has two infrared sensors 211W1/211W2.

The marker controller 206 determines a directionality of the infrared radiation by way of which of the four infrared detectors 211N/211S/211E/211W have detected the infrared radiation. Further, in some embodiments, the marker controller 206 differentiates a friendly identification-friend-or-foe (IFF) interrogation from other infrared signal sources (e.g., laser target designator or range finder), as an identification-friend-or-foe (IFF) interrogation is modulated in a certain, known pattern.

It should be noted that in some marker systems 10, it may be difficult to mount the infrared detectors 211N/211S/211E/211W at 90 degrees from each other and, therefore, it is fully anticipated that any number of infrared detectors 211N/211S/211E/211W be arranged at any angle to each other, including using the Z-axis for detecting infrared radiation from above the wearer.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction, and arrangement of the components thereof without departing from the scope and spirit of the invention or without sacrificing all of its material advantages. The form herein before described being merely exemplary and explanatory embodiment thereof. It is the intention of the following claims to encompass and include such changes.

The invention claimed is:

1. A marker system comprising:
   an enclosure;
   a controller in the enclosure;
   a plurality of emitters electrically interfaced to the controller, the plurality of emitters comprising visible wavelength emitters and infrared wavelength emitters, the controller configured to selectively initiate a flow of electric current though the visible wavelength emitters or through the infrared wavelength emitters causing the visible wavelength emitters or the infrared wavelength emitters to emit light, the light passing through the enclosure;
   at least one infrared detector, each of the at least one infrared detector is electrically interfaced to the controller and each of the at least one infrared detector is configured to detect infrared light that enters the enclosure; and
   when the controller receives an electrical signal from any of the at least one infrared detector indicating reception of the infrared light, the controller emits a signal to warn of the reception of the infrared light.

2. The marker system of claim 1, wherein a first infrared detector of the at least one infrared detectors is aimed in a different direction than a second infrared detector of the at least one infrared detectors, the first direction being different than the second direction; and when the controller receives the electrical signal from the first infrared detector or the second infrared detector indicating the reception of the infrared light, the controller calculates a relative direction from which the infrared light was received and the controller emits the signal to alert of the reception of the infrared light, the signal includes the relative direction from which the infrared light was received.

3. The marker system of claim 2, wherein the marker system further comprises an electronic compass and before the controller emits the signal to alert of the reception of the infrared light, the controller determines a true direction from which the infrared light was received from the relative direction and a reading from the electronic compass, and the controller emits the signal that includes the true direction from which the infrared light was received.

4. The marker system of claim 1, wherein each of the at least one infrared detector comprises at least two infrared sensors, each of the at least two infrared sensors detect different bands or ranges of infrared light.

5. The marker system of claim 1, wherein when the controller emits the signal to warn of the reception of the infrared light, the controller emits the signal by way of a vibration device.

6. The marker system of claim 1, wherein when the controller emits the signal to alert of the reception of the infrared light, the controller emits the signal by way of an audio output device.

7. The marker system of claim 1, wherein when the controller emits the signal to warn of the reception of the infrared light, the controller emits the signal by way of a visible display.

8. The marker system of claim 2, wherein when the controller emits the signal to warn of the reception of the infrared light, the controller emits the signal by way of a vibration device, a vibration pattern of the vibration device is encoded with the relative direction from which the infrared light was received.

9. The marker system of claim 2, wherein when the controller emits the signal to warn of the reception of the infrared light, the controller emits the signal by way of an audible device that is encoded with the relative direction from which the infrared light was received.

10. The marker system of claim 2, wherein when the controller emits the signal to warn of the reception of the infrared light, the controller emits the signal by way of a visible display that graphically or numerically depicts the relative direction from which the infrared light was received.

11. The marker system of claim 1, wherein when the controller emits the signal to warn of the reception of the infrared light, the controller sends the signal over a wired communications link.

12. The marker system of claim 1, wherein the marker system further comprises a wireless transmitter and when the controller emits the signal to warn of the reception of the infrared light, the controller sends the signal over a wireless communications link using the wireless transmitter.

13. A method of detecting infrared light at a marker device, the method comprising:
  a controller selectively initiating a flow of electric current though one or more visible wavelength emitters and/or through one or more infrared wavelength emitters, thereby causing the one or more visible wavelength emitters and/or the one or more infrared wavelength emitters to emit light, the light passing through an enclosure that houses the controller and the one or more visible wavelength emitters and/or the one or more infrared wavelength emitters;
  upon receiving infrared light that passes through the enclosure and onto at least one infrared detector that is electrically interfaced to the controller, one or more of the at least one infrared detector providing an electrical signal to the controller indicating reception of the infrared light; and
  responsive to the controller receiving the electrical signal, the controller emitting an alert to warn of the reception of infrared light.

14. The method of claim 13, wherein a first infrared detector of the at least one infrared detector is aimed in a first direction and a second infrared detector of the at least one infrared detector is aimed in a second direction, the first direction being different than the second direction; and when receiving the electrical signal by the controller from either of the first infrared detector or the second infrared detector, the controller determining a relative direction from which the infrared signal came and the controller emitting the alert to warn of the reception of the infrared light, the alert including the relative direction from which the infrared light was received.

15. The method of claim 14, further comprising when the controller emits the alert to warn of the reception of the infrared light, the controller determining a true direction from which the infrared light was received by using an electronic compass located within the enclosure and electrically interfaced to the controller, and including the true direction in the alert to indicate the true direction from which the infrared light was received.

16. The method of claim 13, wherein each of the at least one infrared detector comprises at least two infrared sensors, each of the at least two infrared sensors detecting different ranges of wavelength of the infrared light.

17. The method of claim 13, wherein when emitting the alert by the controller to alert of the reception of the infrared light, emitting the alert by way of a vibration device.

18. The method of claim 13, wherein when emitting the alert by the controller to alert of the reception of the infrared light, emitting the alert by way of an audio output device.

19. The method of claim 13, wherein when emitting the alert to warn of the reception of the infrared light, the controller sending the alert over a wireless communications link.

20. A marker system comprising:
  an enclosure;
  a controller in the enclosure;
  a plurality of emitters electrically interfaced to the controller, the plurality of emitters comprising visible wavelength emitters and/or infrared wavelength emitters, the controller configured to selectively initiate a flow of electric current though the visible wavelength emitters and/or through the infrared wavelength emitters causing the visible wavelength emitters and/or the infrared wavelength emitters to emit light, the light passing through the enclosure;
  a first infrared detector is electrically interfaced to the controller and aimed to receive infrared light through the enclosure;
  a second infrared detector is electrically interfaced to the controller and aimed to receive the infrared light through the enclosure, aimed in a different direction than the first infrared detector; and
  when the controller receives an electrical signal from any of the first infrared detector and/or the second infrared detector, the electrical signal indicating reception of the infrared light, the controller determines a relative direction from which the infrared light came and the controller emits a signal to alert of the reception of the infrared light, the signal includes the relative direction.

21. The marker system of claim 20, wherein the marker system further comprises an electronic compass that is electrically and communicatively interfaced to the controller and when the controller receives the electrical signal from any of the first infrared detector and the second infrared detector, the controller determines a true direction from which the infrared light was received, the controller emits the signal to warn of the reception of the infrared light, the signal including the true direction from which the infrared light was received.

22. The marker system of claim 20, wherein when the controller emits the signal to alert of the reception of the infrared light, the controller emits the signal by way of a vibration device.

23. The marker system of claim 20, wherein when the controller emits the signal to alert of the reception of the infrared light, the controller emits the signal by way of an audio output device.

* * * * *